United States Patent
Barnett et al.

[11] Patent Number: 6,142,277
[45] Date of Patent: Nov. 7, 2000

[54] MAGNETIC RATCHET/CLUTCH-TYPE APPARATUS

[76] Inventors: Franklin E. Barnett, 14560 E. Evans Pl., Aurora, Colo. 80014; Brian D. Smith, 8863 S. Maplewood Dr., Highlands Ranch, Colo. 80126

[21] Appl. No.: 09/416,145

[22] Filed: Oct. 11, 1999

Related U.S. Application Data

[62] Division of application No. 08/808,627, Apr. 15, 1997, Pat. No. 5,970,825.
[60] Provisional application No. 60/015,484, Apr. 15, 1996, and provisional application No. 60/030,031, Nov. 4, 1996.

[51] Int. Cl.[7] .................................... F16D 41/06
[52] U.S. Cl. .................... 192/43.1; 192/44; 192/84.3
[58] Field of Search ............... 192/43.1, 44, 45, 192/46, 84.3; 81/59.1, 60

[56] References Cited

U.S. PATENT DOCUMENTS

| | | |
|---|---|---|
| 2,300,223 | 10/1942 | Hottenrogh, Jr. . |
| 2,410,818 | 11/1946 | Grant, Jr. . |
| 2,583,843 | 1/1952 | Herrick . |
| 2,624,435 | 1/1953 | Stephenson . |
| 2,804,184 | 8/1957 | Bjork . |
| 3,081,044 | 3/1963 | Keith . |
| 3,137,883 | 6/1964 | Deccannies . |
| 3,182,139 | 5/1965 | Meletti . |
| 3,292,756 | 12/1966 | Stevinson . |
| 3,378,214 | 4/1968 | Hilsinger . |
| 3,430,885 | 3/1969 | Holmberg . |
| 3,432,016 | 3/1969 | Vogt . |
| 3,528,624 | 9/1970 | Tamarin . |
| 4,063,626 | 12/1977 | Solomon . |
| 4,770,279 | 9/1988 | Shiozaki et al. . |
| 5,205,386 | 4/1993 | Goodman et al. . |
| 5,390,773 | 2/1995 | Proia . |
| 5,404,773 | 4/1995 | Norville . |

FOREIGN PATENT DOCUMENTS

| | | |
|---|---|---|
| 538819 | 3/1957 | Canada . |
| 890087 | 8/1953 | Germany . |
| 2112593 | 1/1972 | Germany . |
| 55-119231 | 12/1980 | Japan . |
| 3288025 | 12/1991 | Japan . |
| 4191535 | 7/1992 | Japan . |
| 425005 | 4/1974 | U.S.S.R. . |
| 765586 | 1/1957 | United Kingdom . |
| 847395 | 9/1960 | United Kingdom . |

*Primary Examiner*—Richard M. Lorence
*Attorney, Agent, or Firm*—Brian D. Smith

[57] ABSTRACT

Socket-type wrenches using a magnetic ratchet/clutch-type apparatus are disclosed. The apparatus preferably employs several pawls, as well as a ratchet-type wheel for engaging the pawls. The apparatus also utilizes the wrench's body which defines a chamber in which the wheel is received for rotation relative to the wrench body. The chamber also defines pockets for positioning the pawls adjacent the wheel to facilitate their movement between a drive position and a release position. In the drive position, at least one pawl is sandwiched between the wheel and a wall of the pocket to prevent the wrench body and the wheel from rotating relative to each other which enables a drive stroke to be made with the wrench. In the release position, the pawl is disengaged from the wheel which permits one to make a return stroke with the wrench. The apparatus further includes a ring magnet mounted on at least one side of the wheel for magnetically attracting the pawls to facilitate their movement into the drive position. Finally, the apparatus includes abutments which are utilized during the return stroke of the wrench to move the pawls out of engagement with the wheel.

29 Claims, 19 Drawing Sheets

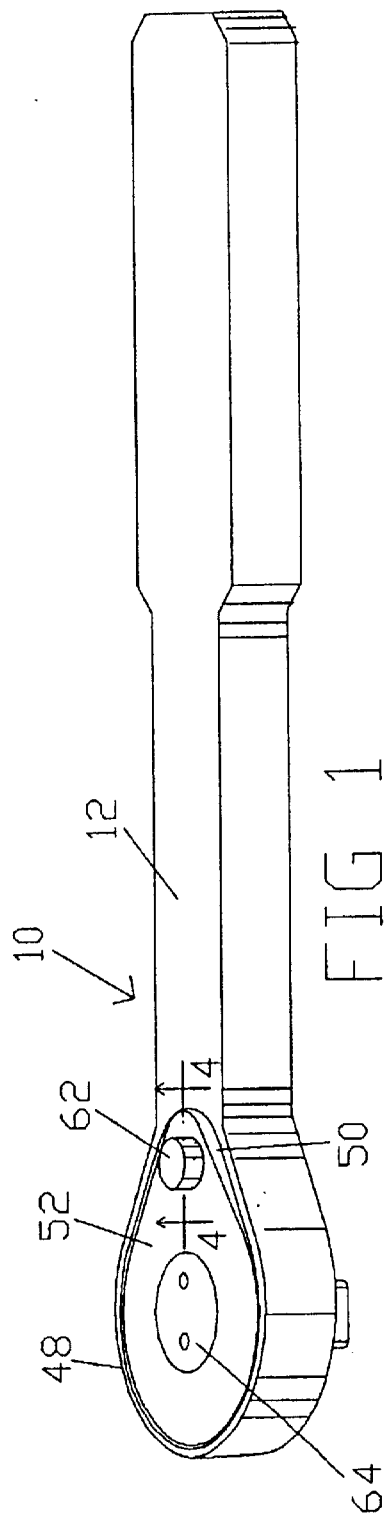
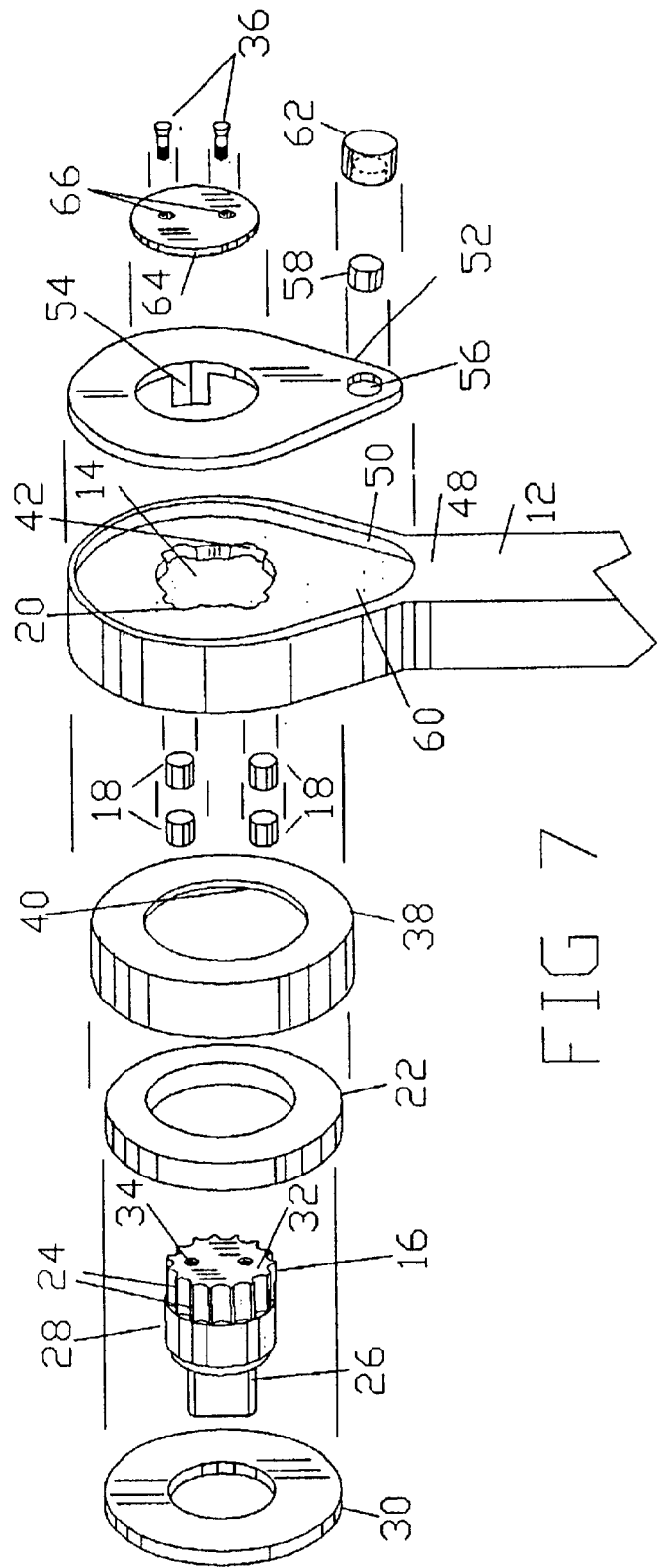

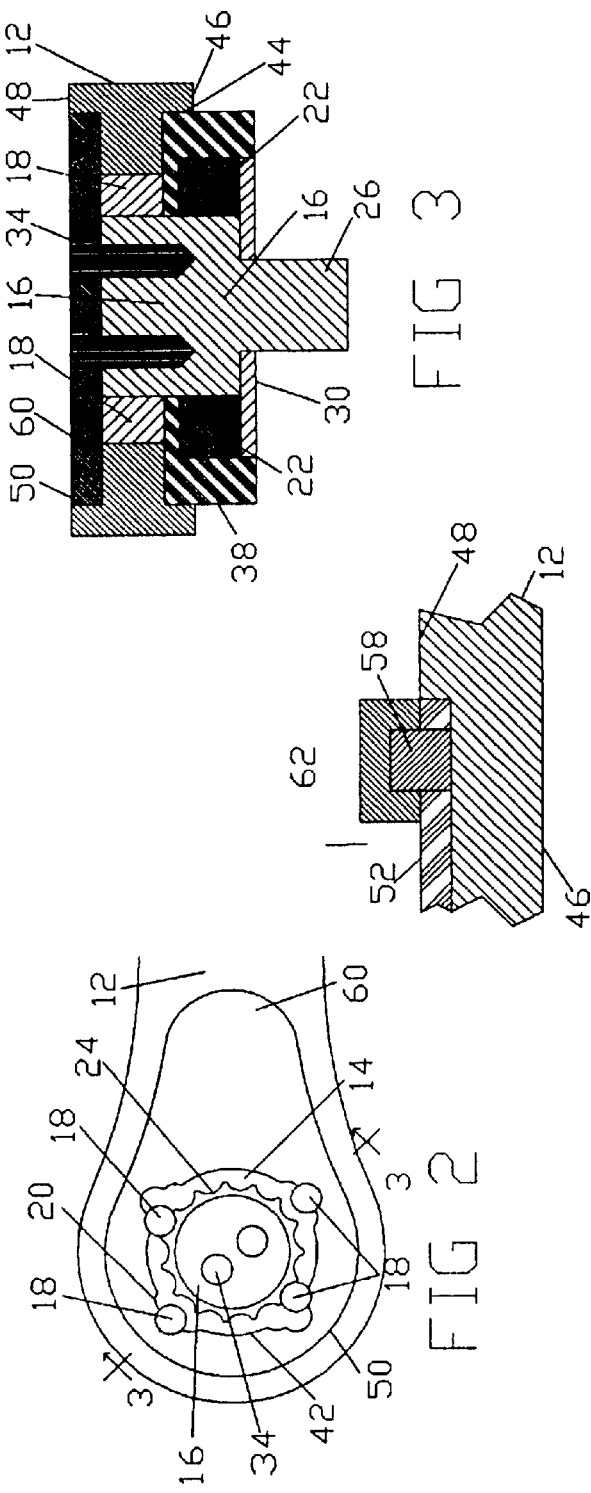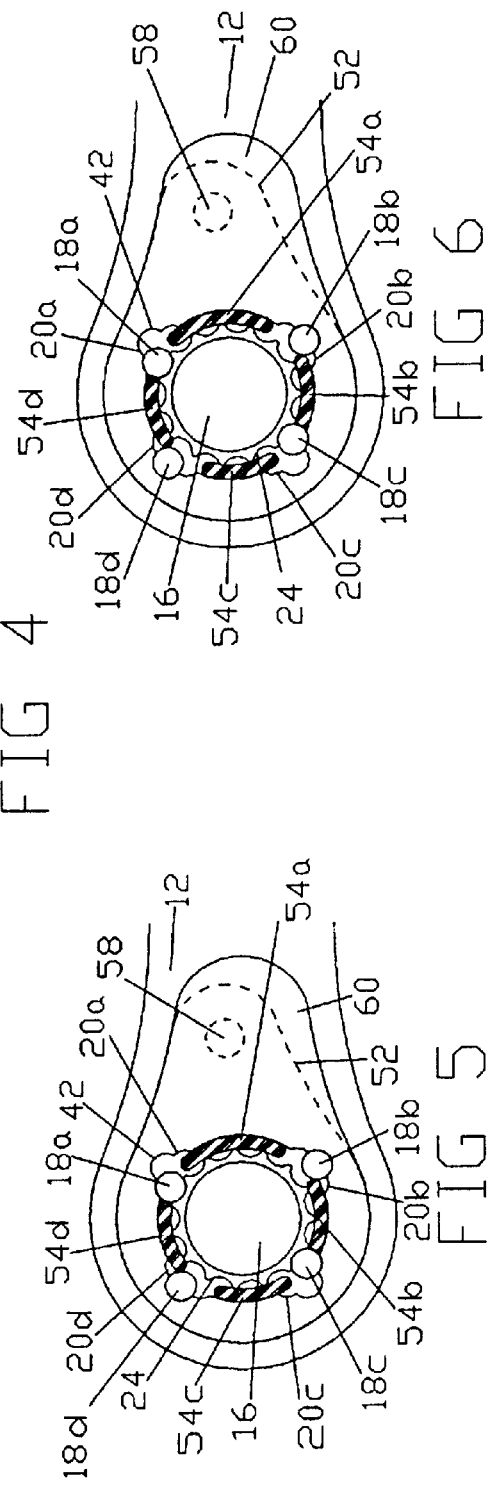

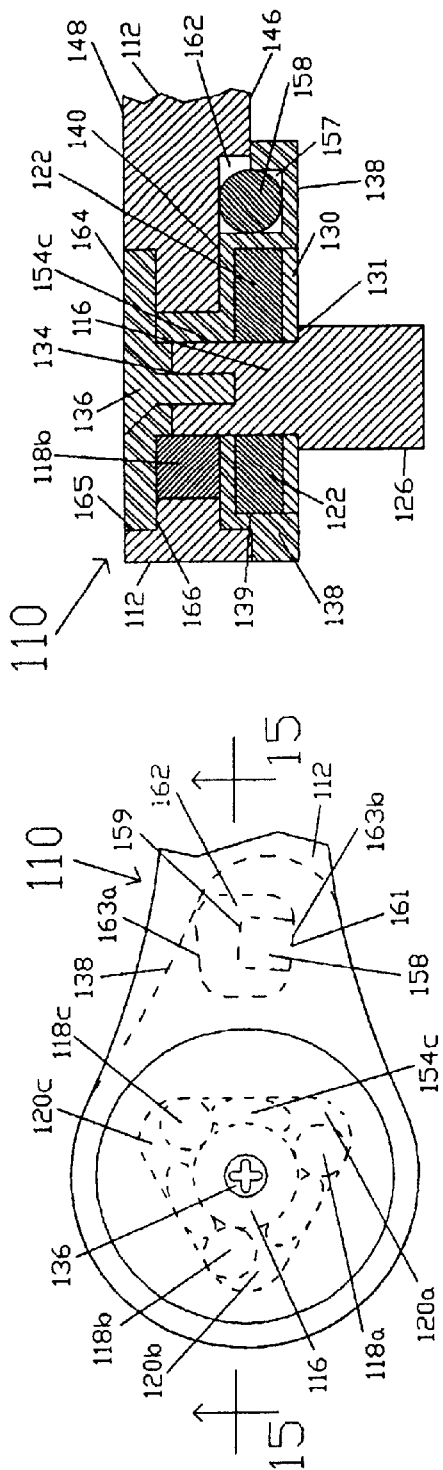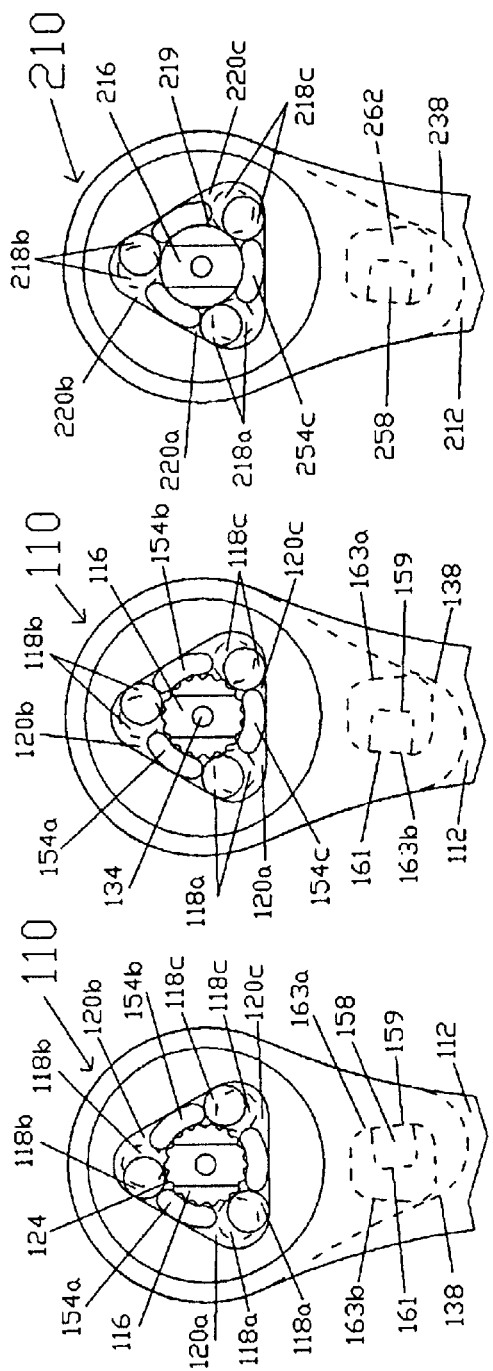

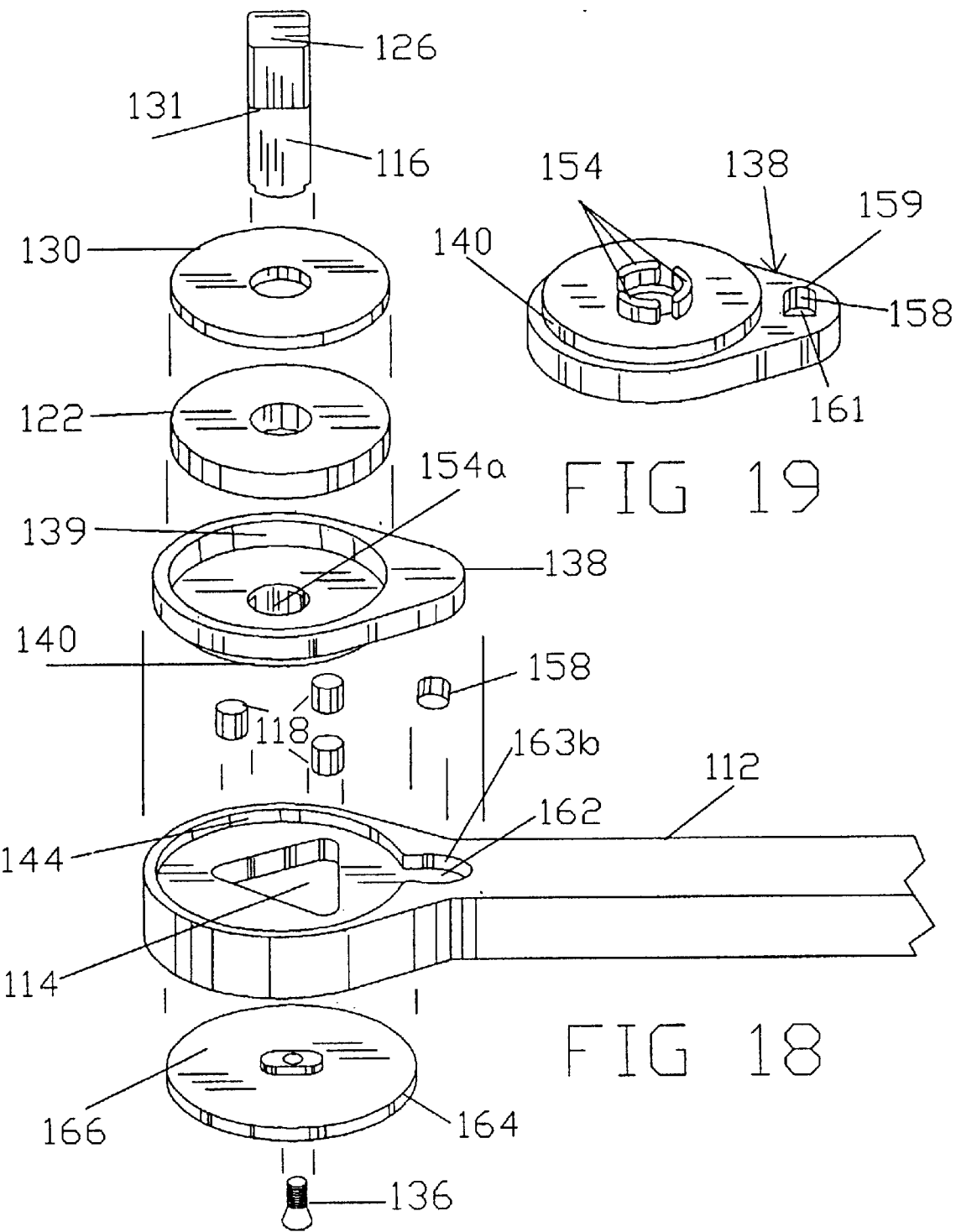

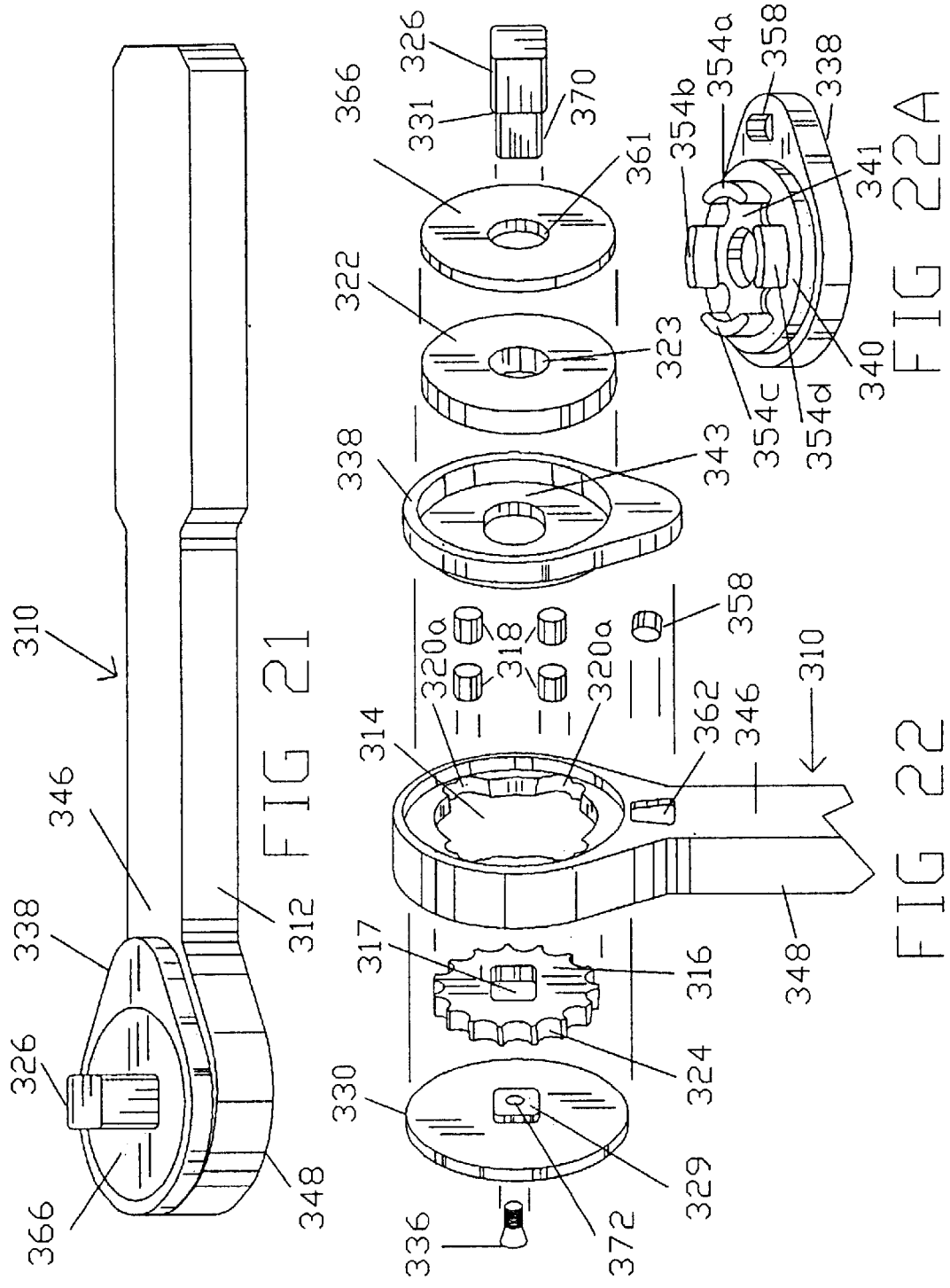

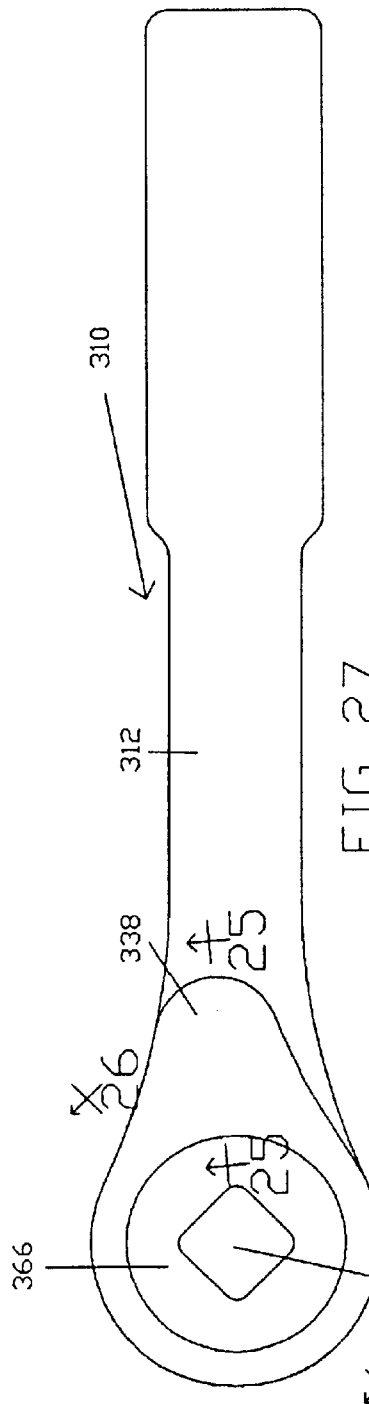
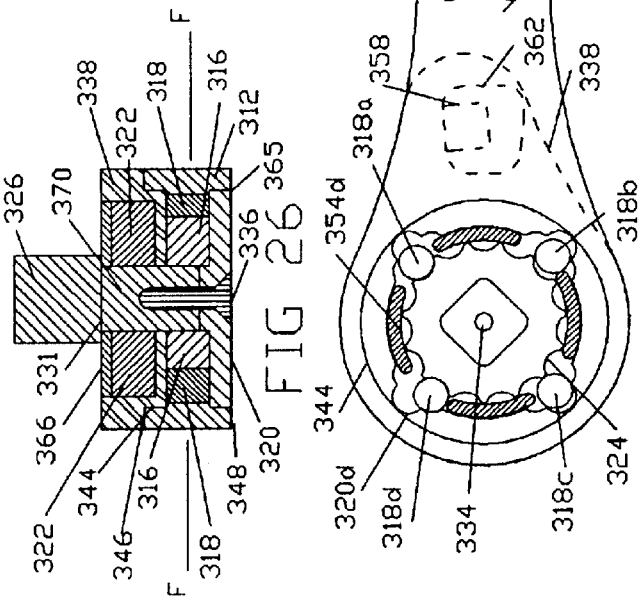
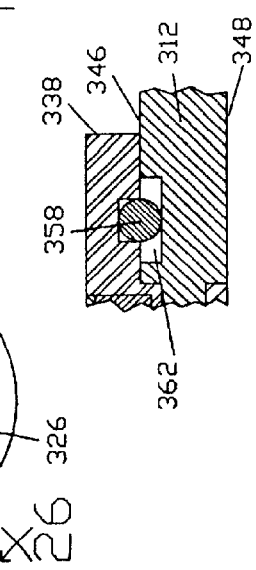
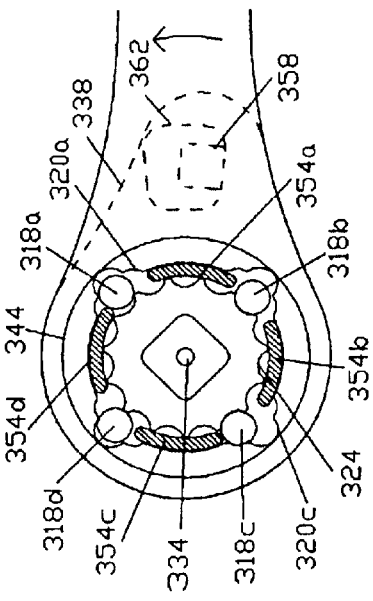

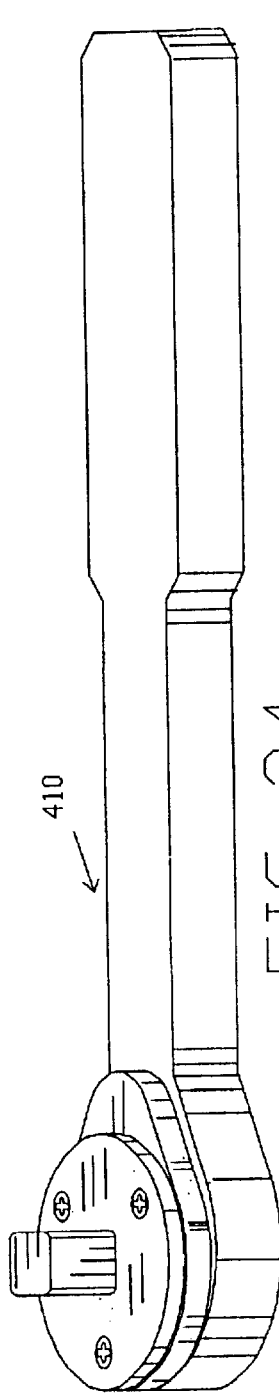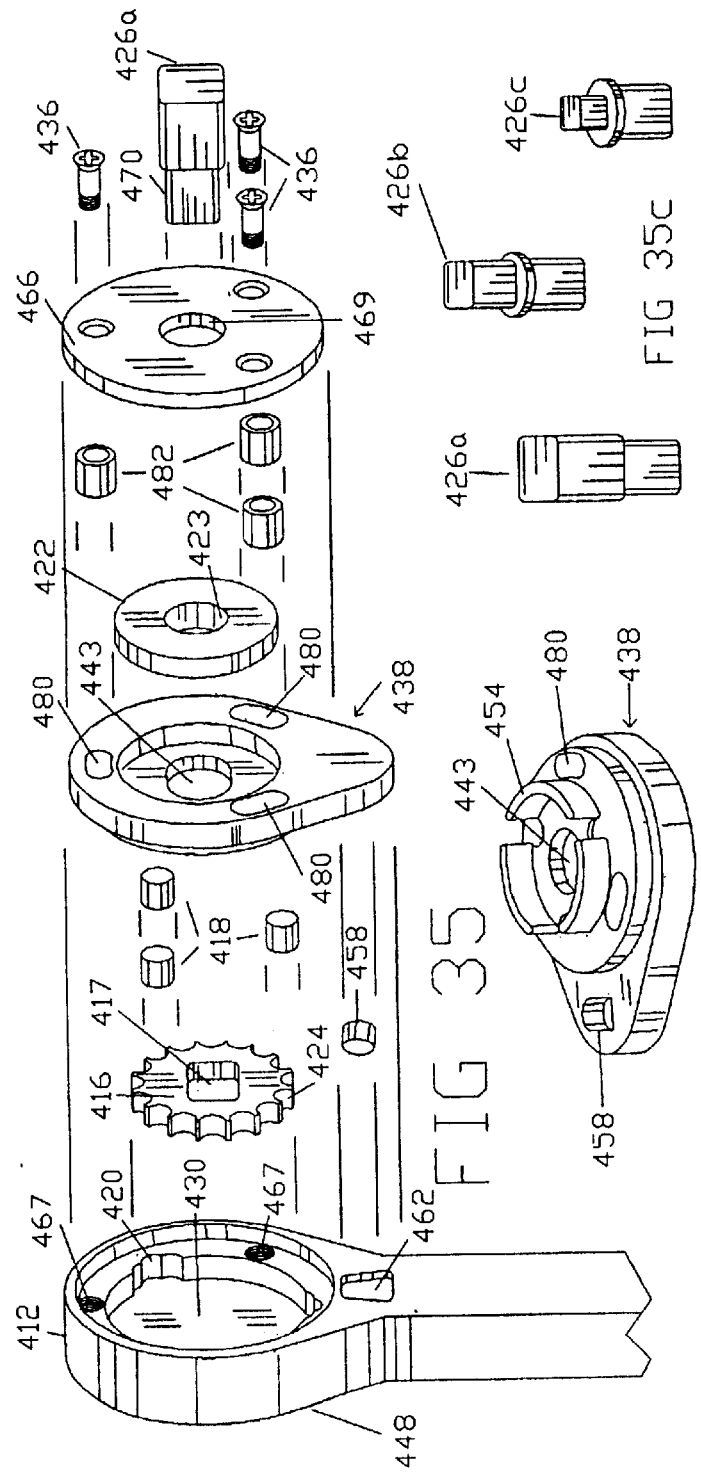

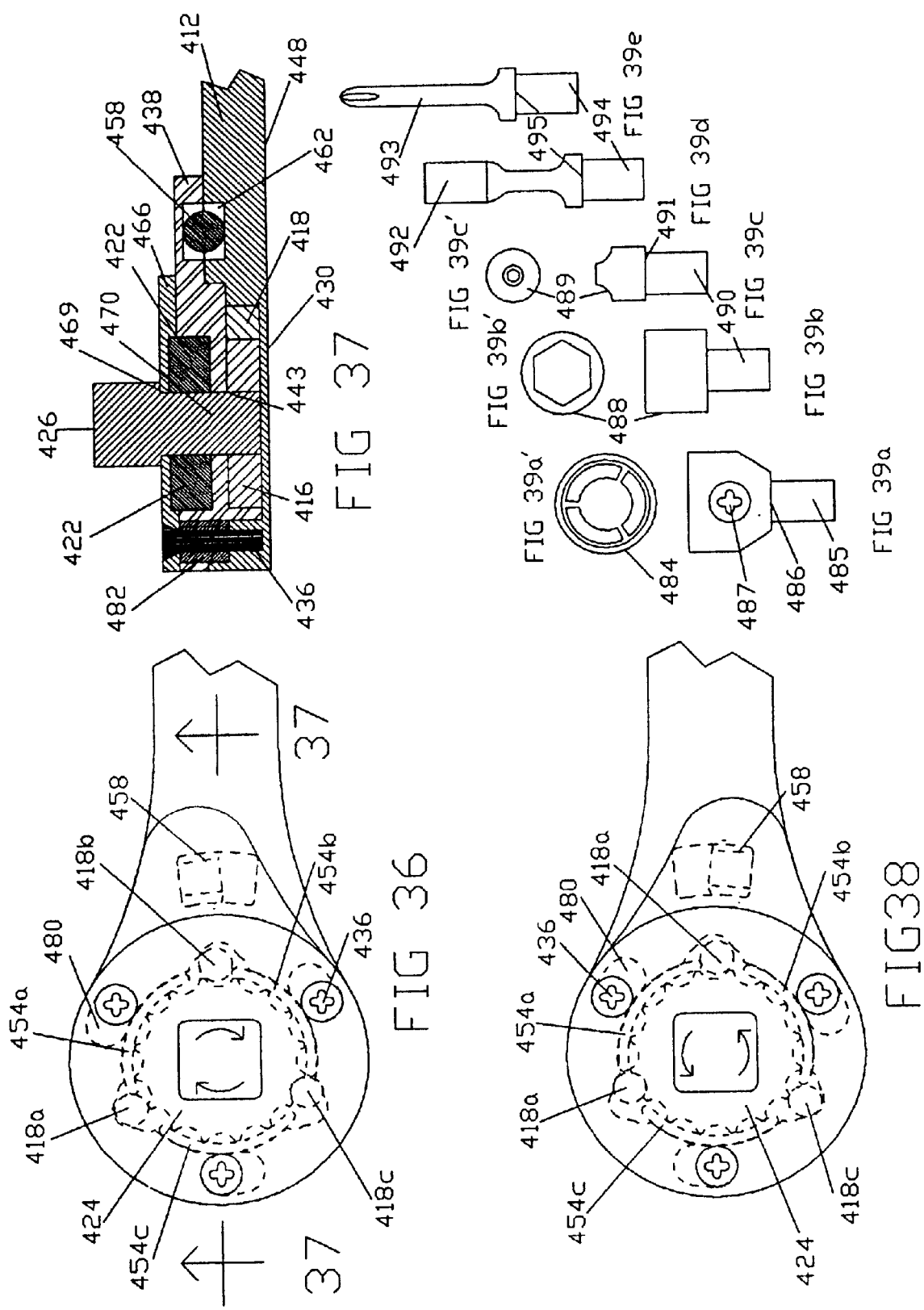

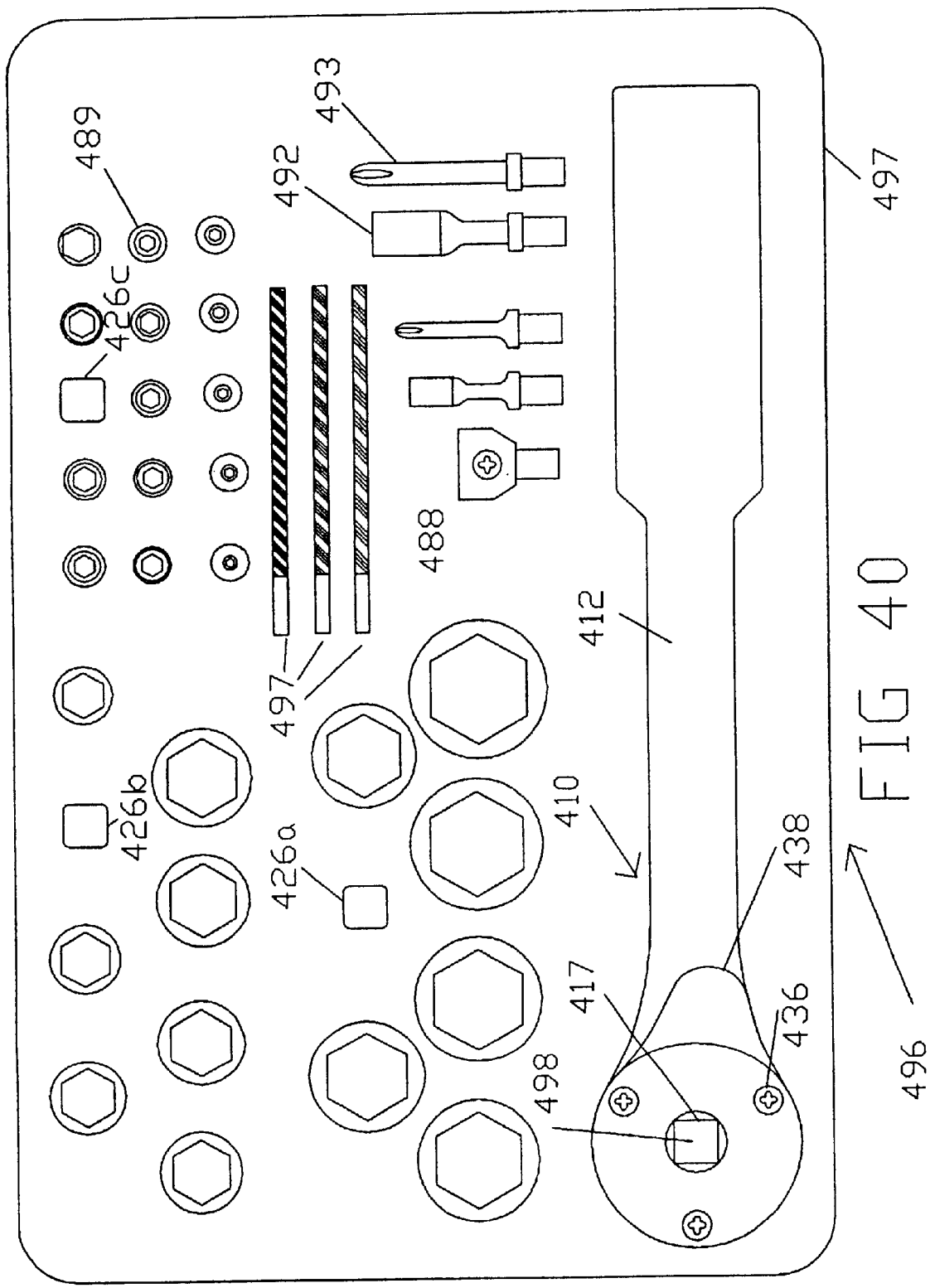

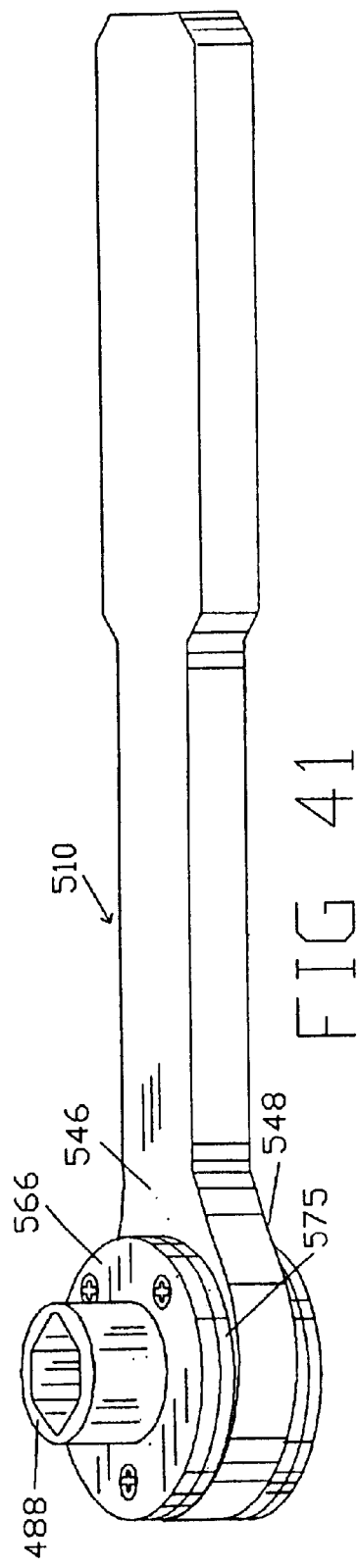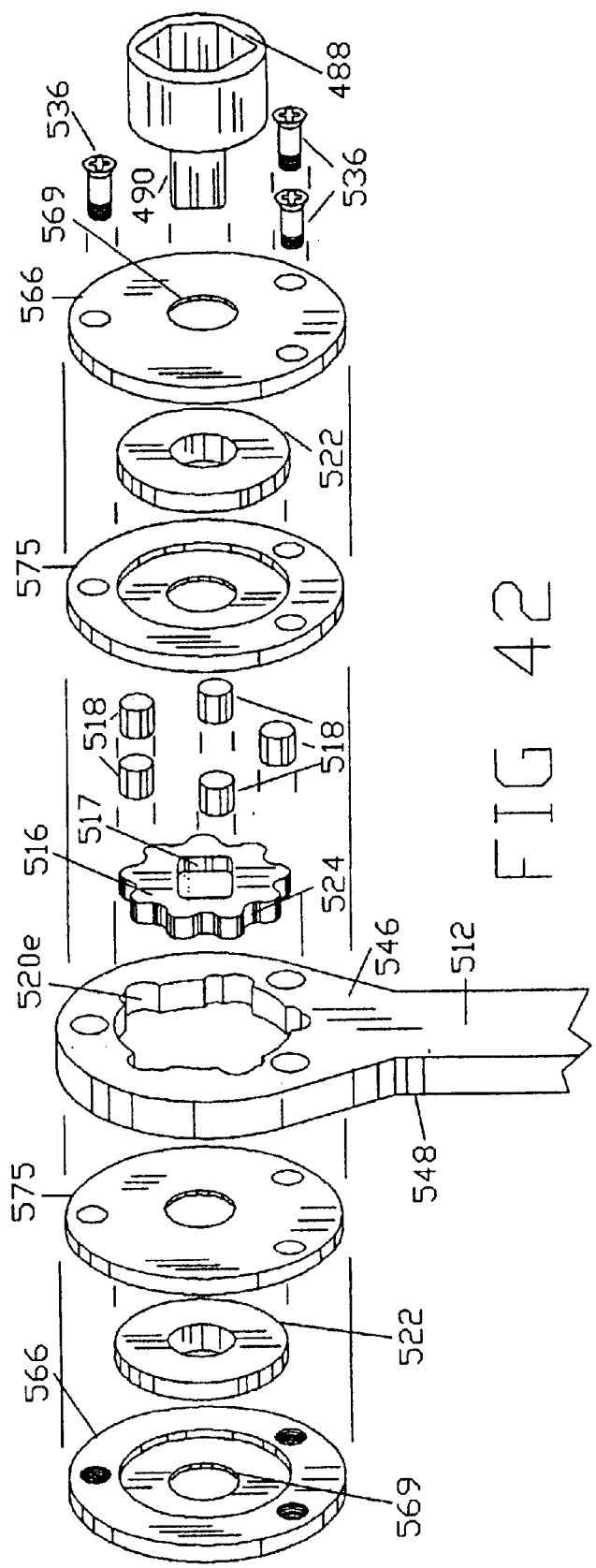

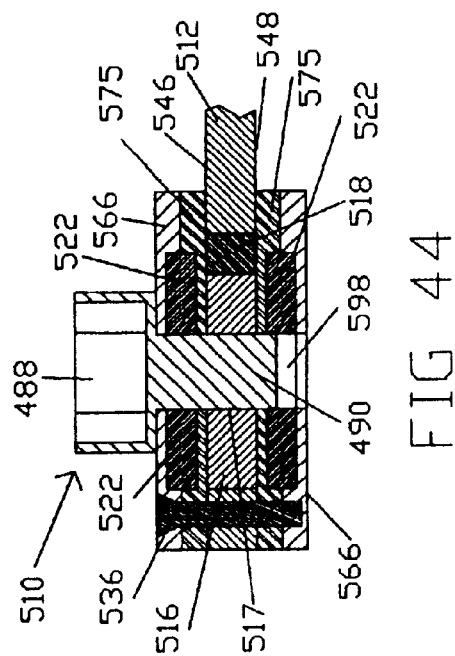
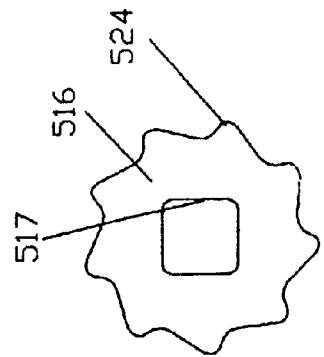
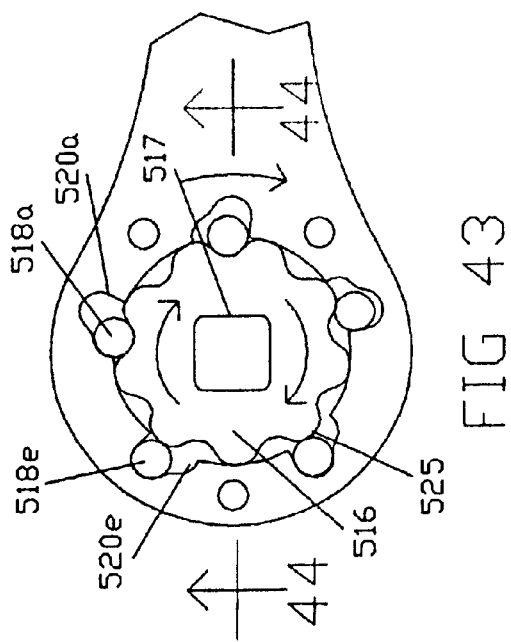
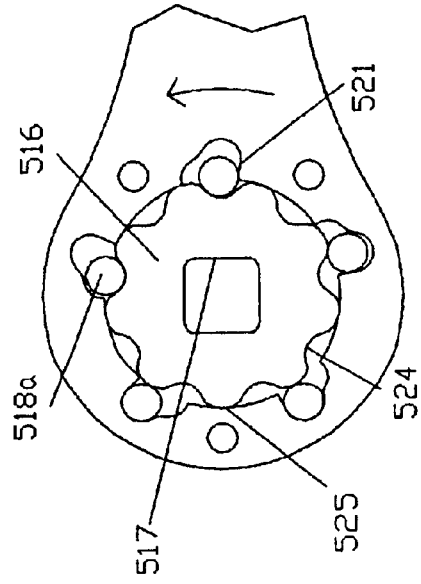

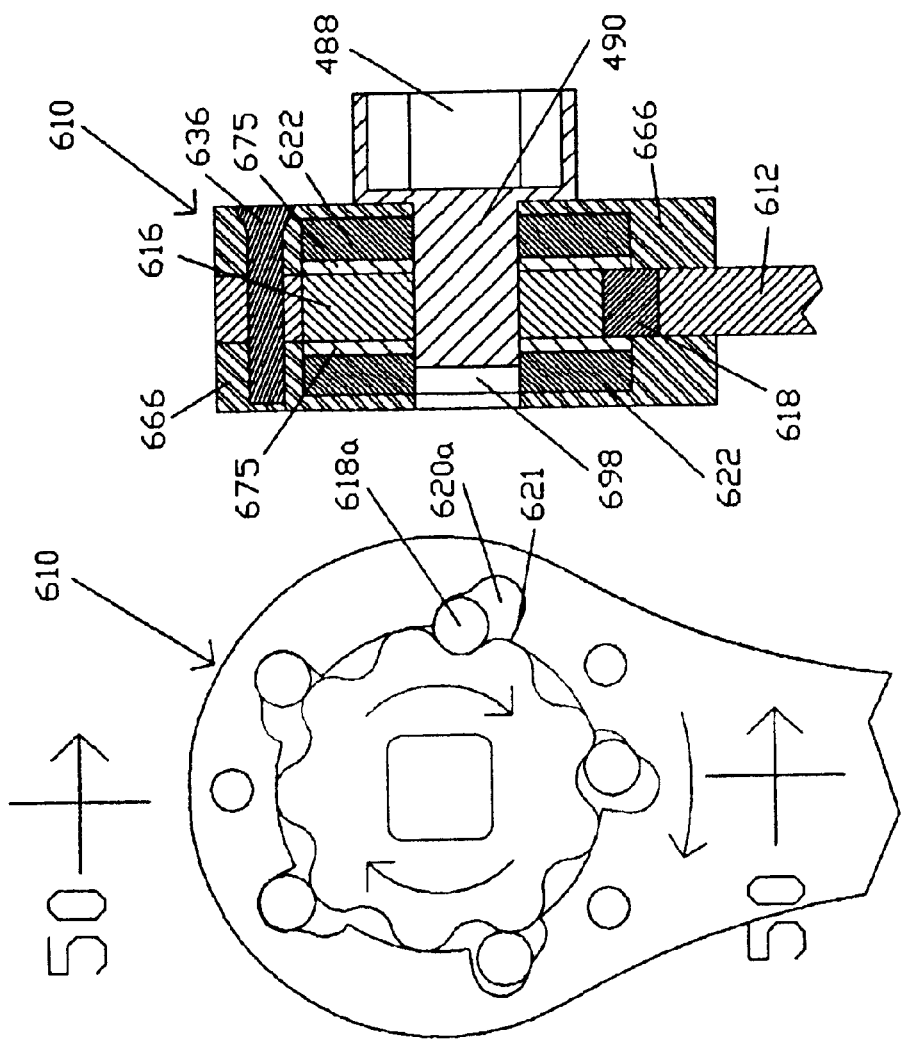
FIG 49
FIG 50
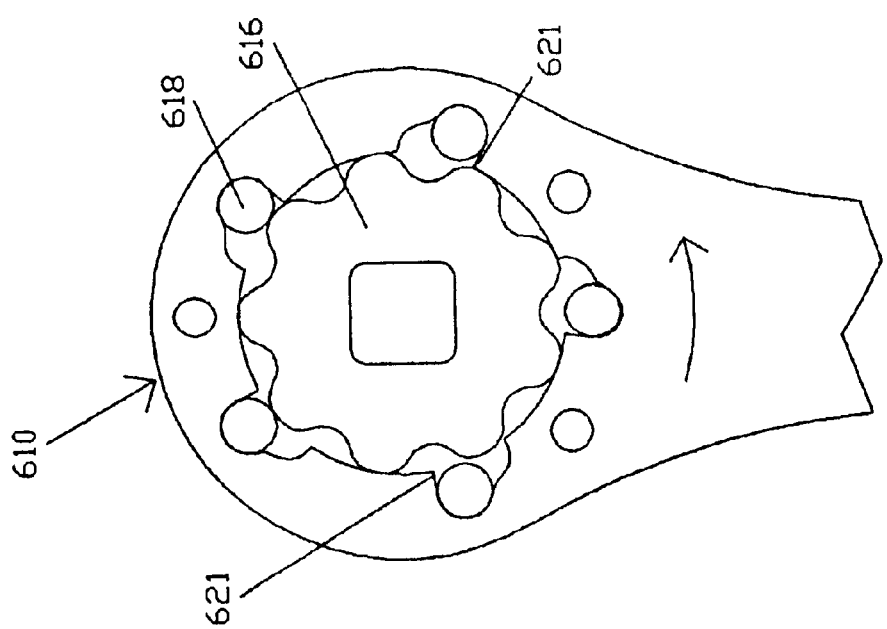
FIG 51

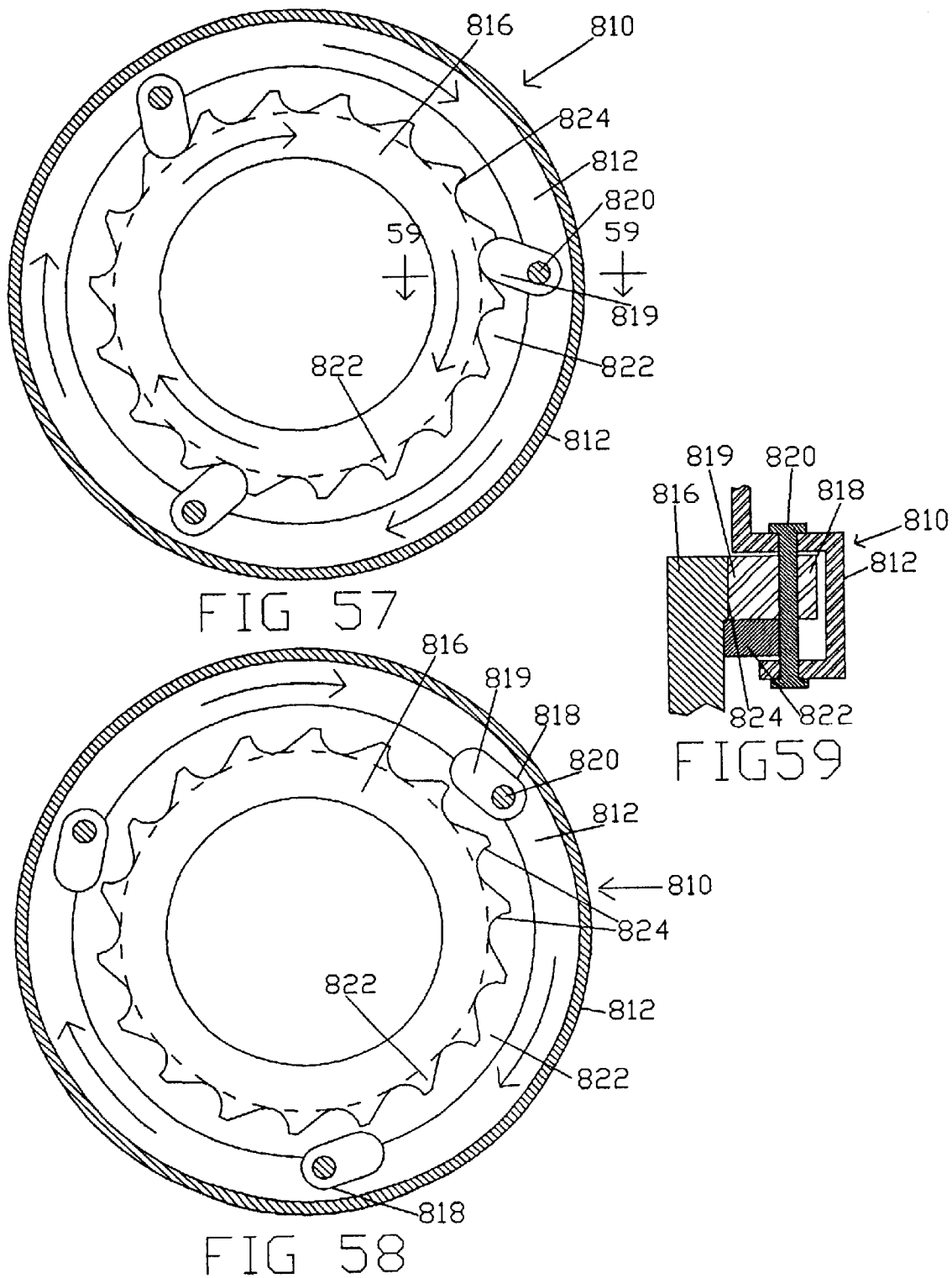

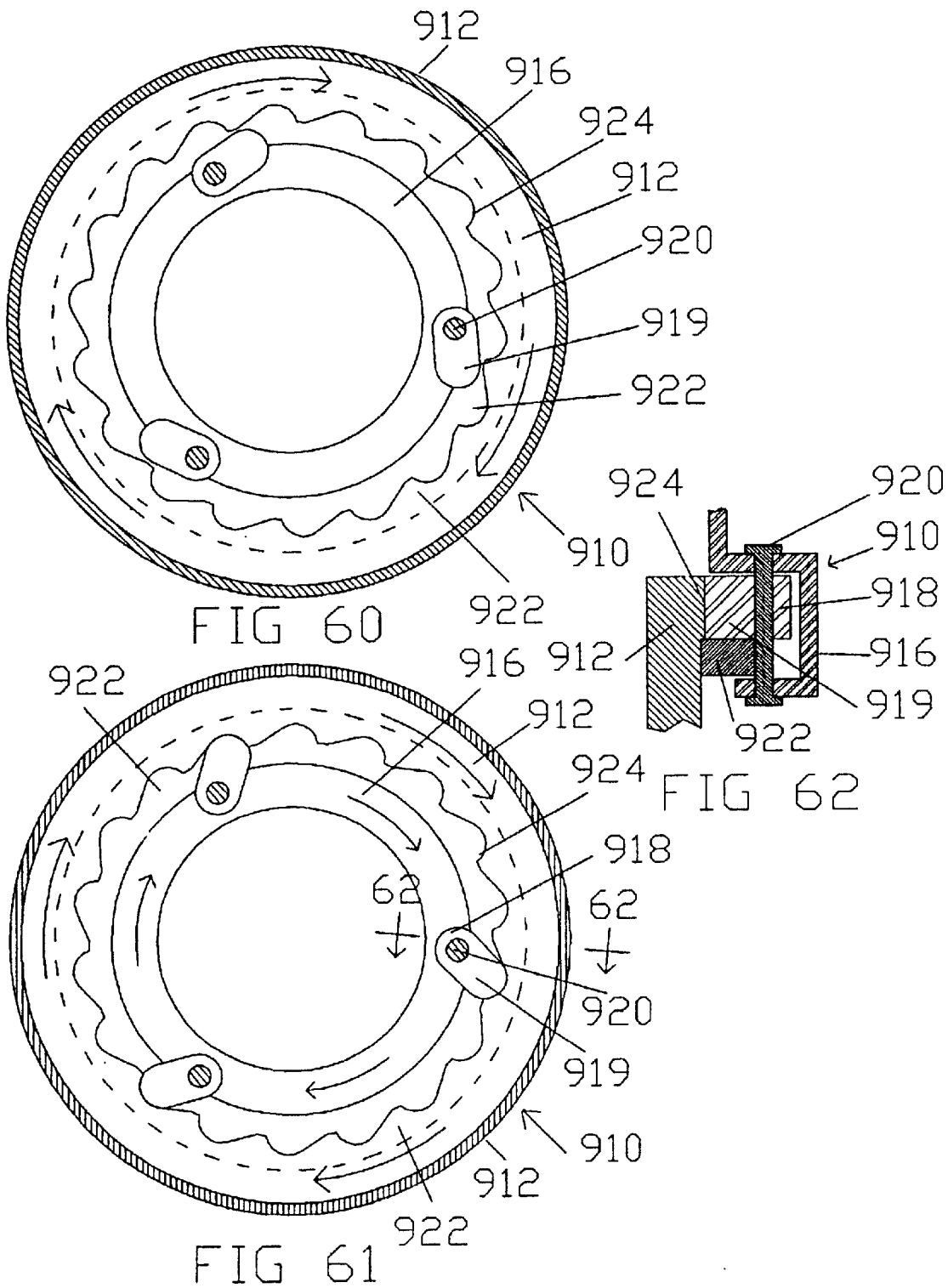

MAGNETIC RATCHET/CLUTCH-TYPE APPARATUS

CROSS REFERENCE TO RELATED APPLICATIONS

This application is a divisional of U.S. patent application, Ser. No. 08/808,627, filed Apr. 15, 1997, now U.S. Pat. No. 5,970,825 which claims the benefit under 35 USC 119(e) of U.S. provisional applications Ser. No. 60/015,484, filed on Apr. 15, 1996 and Ser. No. 60/030,031, filed on Nov. 4, 1996.

TECHNICAL FIELD OF THE INVENTION

The invention relates generally to ratchets and clutches, and more particularly to ratchet and clutches which use magnetic force in their operation.

BACKGROUND OF THE INVENTION

The prior art is replete with ratchets and ratcheting mechanisms which are employed in a variety of uses. For example, U.S. Pat. Nos. 4,063,626; 5,386,747; and 4,404,773 disclose ratcheting mechanisms for socket wrenches and other types of tools using ratchets, or ratcheting mechanisms. In addition, U.S. Pat. No. 5,301,893 discloses a ratcheting mechanism for a seat belt retractor and U.S. Pat. No. 4,480,802 discloses a ratcheting mechanism for a fishing reel, the latter also being indicated to provide a silencer for the clicking sound typically associated with ratchets which occurs during the ratchet's release state and is caused by the ratchet's pawl clicking against the teeth of the ratchet wheel as the wheel rotates. U.S. Pat. No. 5,325,790 also discloses a silent ratchet-like apparatus for preventing rollback in a rail vehicle, which also provides a mechanism for reducing or eliminating the clicking noise associated with pawls moving over a tooth rack or ratchet.

While all of the above ratcheting apparatus undoubtedly work as indicated, none is believed to provide the advantages provided by the ratchet/clutch-type apparatus of the present invention which uses a magnet and which include the following:

(1) Less or no clicking noise during the ratchet/clutch-type apparatus' release or return stroke.

(2) Stronger and able to withstand and transmit much more force than a conventional ratchet or clutch due to the use of components, particularly pawls, which are much stronger than those used in conventional ratcheting mechanisms.

(3) Longer life due to the use of no springs for pushing a pawl or clutch roller into engagement with the ratchet wheel. The magnet employed in the present invention replaces the springs found in many conventional ratchets and roller clutches which typically break or wear out over a period of time.

(4) Less expensive to manufacture as will be appreciated by those skilled in the relevant art.

(5) When used in a socket wrench, the magnet of the present invention can also be utilized to magnetize the socket wrench's drive so that the drive holds a socket on the wrench by magnetic attraction, thereby eliminating the need for spring loaded pin-like mechanisms for holding the socket. As will be appreciated, the elimination of these pin-like mechanisms will not only reduce manufacturing costs but will also result in a longer lasting wrench since these mechanisms often jam or fail in one way or another.

(6) The present invention also provides a new type of magnetic ratchet/clutch-type wrench which not only replaces a conventional ratchet-type socket wrench but expands thereon by providing a ratchet/clutch-type wrench having a drive hole which receives and magnetically holds a removable drive member of the present invention. As those skilled in the art will appreciate the removable drive member is preferably provided in three different sizes, i.e. with a ½ inch drive, a ⅜ inch drive and a ¼ inch drive, all of which can be received and magnetically held in the drive hole of the wrench. That is, the drive hole of the wrench can receive and magnetically hold a ½ inch removable drive, a ⅜ inch removable drive and a ¼ inch removable drive and these drives in turn magnetically hold conventional female type wrench sockets. Thus, it will be appreciated that such a wrench can replace a full ratchet set which typically has three separate ratchet wrenches, i.e. one with a ½ inch drive, one with a ⅜ drive and one with a ¼ drive. In addition, this wrench can receive and magnetically hold many other types of tools as long as the tool is provided with a drive end of the present invention which is receivable and capable of being magnetically held in the drive hole of the wrench. Such tools include a novel male socket of the present invention as well as a novel chuck of the present invention which in turn receives conventional drill bits, screw bits and the like. Novel screw bits and drill bits having the drive end of the present invention are also provided in accordance with the present invention.

(7) The ratchet/clutch-type apparatus may also be incorporated into a bearing to provide a one-way bearing.

SUMMARY OF THE INVENTION

As known to those skilled in the ratchet and clutch art, a ratchet (or a clutch) transmits force from a first force transmitting member such as a socket wrench handle (or body) to a second force transmitting member such as the ratchet wheel of a socket wrench (or vice versa) when it is in its drive position and it is driven in a specific direction. For example, in a socket wrench such force is transmitted when the wrench handle is turned or rotated in a clockwise direction if the socket wrench's ratcheting apparatus is in its drive position when it is rotated in a clockwise direction. When it is turned or rotated in the opposite, i.e. counter-clockwise direction, the ratcheting apparatus of the wrench releases, i.e. moves into its release state or position in which force is no longer transmitted from the wrench handle to the socket drive. The release position, however, permits relative movement between the wrench handle and the socket drive which enables one to make a return stroke with the handle so that it can be returned to a position which enables one to make another drive stroke with the handle.

As also known to those skilled in the ratchet art, when the ratchet is in its drive position, it is the ratchet's pawl (or pawl means) which locks the first and second force transmitting members together to prevent relative movement therebetween when a force is applied to the first transmitting member in a specific first direction or when a force is applied to the second transmitting member in a specific second direction (which is generally opposite the first direction).

Finally, as also known, when the ratchet is in its release position it is the ratchet's pawl which releases or moves out of engagement with the second force transmitting member (typically the ratchet wheel or rack), which enables relative movement between the first and second force transmitting members when a force is applied to the first transmitting member in a specific first direction or when a force is applied to the second transmitting member in a specific second direction (which is generally opposite the first direction).

The apparatus of the present invention fundamentally operates in a manner very similar to that of a conventional ratchet or roller clutch. However, it does it with magnetic force and with components which cooperate in a unique way to provide the aforementioned advantages.

In its broadest sense, the apparatus of the present invention includes a first force transmitting member, a second force transmitting member, an engaging member generally positioned between the first and second force transmitting member for being moved between a drive position and a release position, offset means for cooperating with the engaging member so that they are magnetically attracted to each other to facilitate movement of the engaging member into the drive position, and means for facilitating movement of the engaging member into its release position. When the first transmitting member is moved in a first direction, the engaging member of the present invention is moved into its drive position in which it engages both the first and second force transmitting member to prevent relative movement therebetween and thereby transmit force from the first transmitting member to the second transmitting member. When the first transmitting member is moved in a second direction which is opposite the first direction, the engaging member releases or moves out of engagement with the second force transmitting member which permits relative movement between the first and second force transmitting member, thereby enabling one to make a return stroke with the first force transmitting member.

In accordance with an important aspect of the invention, the offset means and the engaging member are positioned or oriented relative to each other such that the lines of magnetic force therebetween are at an angle relative to the direction in which force is transmitted between the first and the second force transmitting members. In a particularly preferred embodiment of the invention, the offset means provides the magnetic force with a permanent magnet. The permanent magnet is positioned relative to the other components so that most, preferably all, of the force transmitted between the first and second force transmitting members bypasses the magnet. In most situations, this will mean that the magnet is positioned out of the plane or isolated from the plane in which force is transmitted between the first and second force transmitting members. As those skilled in the art of permanent magnets will appreciate, it is important that the magnet pass little, preferably none, of the force being transmitted between the first and second transmitting members due to the brittle nature of permanent magnets.

In yet another embodiment of the present invention, the offset means includes permanent magnet means which magnetizes the second force transmitting member so that the engaging member and the second force transmitting member are attracted to each other which in turn facilitates movement of the engaging member into the drive position. In yet another embodiment of the present invention wherein the offset means is fixed relative to the second force transmitting member, the magnetic means restrains movement of the engaging member relative to the second force transmitting member so that said first force transmitting member facilitates movement of the engaging member engaging member into the drive position.

In a preferred embodiment of the present invention ideally suited for use in ratcheting tools such as a socket wrench, the engaging member is includes a generally cylindrical shaped pawl. The second force transmitting member includes a ratchet wheel, and the first force transmitting member includes a wrench body defining a chamber in which the ratchet wheel is received for rotation relative to the wrench body. The wrench body also defines a pocket for each engaging member which is also often referred to herein as a pawl which opens into the chamber or is part of the chamber defined by the wrench body. Each pocket receives and positions a pawl adjacent the ratchet wheel to facilitate the pawl's movement between a drive position in which it is sandwiched between and engaging the ratchet wheel and the wrench body, and a release position in which it is not engaging the ratchet wheel. Thus, in the release position, the wrench body and ratchet wheel are capable of rotating relative to each other, whereas in the drive position, the wrench body and ratchet wheel are prevented from rotating relative to each other.

The magnetic means of this preferred embodiment includes a ring magnet which is coaxially aligned with the ratchet wheel to one side thereof for attracting the pawl(s) to the ratchet wheel to facilitate their movement into the drive position when the wrench body is rotated in a first direction. The means for facilitating movement of the pawl means into its release position includes abutments or posts positioned adjacent each pocket, and between the rachet wheel and the wrench body which push the pawl(s) into their release position when the wrench body is rotated in an opposite second direction. The wrench also preferably includes reversing means for reversing the direction in which the wrench operates so that the pawl(s) are moved into their drive position (actually attracted to the ratchet wheel) when the wrench body is rotated in the second direction and into their release position when the wrench body is moved in the first direction.

In one embodiment of the invention, the cylindrical pawls are received in complimentarily shaped cylindrical detents provided in the ratchet wheel to enhance engagement of the pawl with the wheel which in turn prevents the rotation of the wrench body relative to the ratchet wheel when the wrench is rotated in its first or driving direction.

In another preferred embodiment of the present invention which is more in the nature of a clutch, particularly a roller clutch, the ratchet wheel has a smooth cylindrical surface, i.e. no detents for receiving the pawls. Despite the use of a smooth wheel, the friction between the wheel and the engaging member (which includes at least three preferably more engaging member) is sufficient to prevent the wheel from rotating relative to the wrench body, i.e. when each engaging member is in its drive position in which it is sandwiched or wedged between the ratchet wheel and the wall of the pocket in which it is received.

Yet another embodiment of the present invention provides a ratchet/clutch-type wrench having a drive hole which receives and magnetically holds a removable drive member of the present invention. The removable drive member is preferably provided in three different sizes, i.e. with a ½ inch drive, a ⅜ inch drive and a ¼ inch drive, all of which can be received and magnetically held in the drive hole of the wrench. That is, the drive hole of the wrench can receive and magnetically hold a ½ inch removable drive, a ⅜ inch removable drive and a ¼ inch removable drive and these drives in turn magnetically hold conventional female type wrench sockets. In addition, this wrench can receive and magnetically hold many other types of tools as long as the tool is provided with a drive end of the present invention which is receivable and capable of being magnetically held in the drive hole of the wrench. Such tools include a novel male socket of the present invention as well as a novel chuck of the present invention which in turn receives conventional drill bits, screw bits and the like. Novel screw bits and drill bits having the drive end of the present invention are also provided in accordance with the present invention.

BRIEF DESCRIPTION OF DRAWINGS

The invention will be more readily understood by reference to the accompanying drawings wherein like reference numerals indicate like elements, and wherein reference numerals sharing the same last two digits identify similar corresponding elements throughout the various disclosed embodiments, and in which:

FIG. 1 is a top plan view of a magnetic socket wrench of the present invention.

FIG. 2 is a top plan view of the wrench of FIG. 1 showing, however, the inner components of the wrench's ratcheting apparatus as they appear after removing the wrench's top end cap 64 and tear drop shaped reversing mechanism 52.

FIG. 3 is a cross sectional view taken along lines 3—3 of FIG. 2.

FIG. 4 is a cross sectional view taken along lines 4—4 of FIG. 1.

FIG. 5 is a top plan view of the inner components of the ratcheting mechanism of the wrench of FIG. 1 showing the position of the components in the mechanism's forward position, and when the wrench is rotated in its driving clockwise direction.

FIG. 6 is a view similar to FIG. 5 showing, however, the position of the ratcheting mechanism's components as they would appear when the mechanism is switched to its reverse direction by moving tear drop shape mechanism 52 to its reverse position.

FIG. 7 is an exploded perspective view showing the components of the wrench of FIG. 1.

FIG. 14 is a top plan view of another socket wrench embodiment of the present invention which in dotted lines additionally shows some of the inner components of the wrench's ratcheting apparatus. The detents of the ratchet wheel are, however, not shown in this view.

FIG. 15 is a cross sectional view taken along lines 15—15 of FIG. 14.

FIG. 16 is a top plan view of the wrench of FIG. 14 showing the wrench with its end cap removed to illustrate the position of the wrench's inner ratcheting components (and its reversing member in dotted lines) as they appear when making a drive stroke with the wrench in its forward position.

FIG. 17 is a top plan view of the wrench of FIG. 14 showing the wrench with its end cap removed to illustrate the position of the wrench's inner ratcheting components (and its reversing member in dotted lines) as they appear when making a drive stroke with the wrench in its reverse position.

FIG. 18 is an exploded perspective view showing the components of the wrench of FIG. 14.

FIG. 19 is a perspective view of the reversing member of the wrench of FIG. 14 illustrating the components thereof located on its underside.

FIG. 20 is a top plan view of a third socket wrench embodiment of the present invention showing the wrench with its end cap removed to illustrate the position of the wrench's inner ratcheting components (and its reversing member in dotted lines) as they appear when making a drive stroke with the wrench.

FIG. 21 is a perspective view of a fourth magnetic socket wrench embodiment of the present invention.

FIG. 22 is an exploded perspective view showing the components of the wrench of FIG. 21.

FIG. 22a is a perspective view of the reversing member of the wrench of FIG. 21 illustrating the components thereof located on its underside.

FIG. 23 is a top plan view of the wrench of FIG. 21 showing the wrench with its end cap removed to illustrate the position of the wrench's inner ratcheting components (and its reversing member in dotted lines) as they appear when making a drive stroke with the wrench in its reverse position.

FIG. 24 is a top plan view of the wrench of FIG. 21 also showing the wrench with its end cap removed to illustrate the position of the wrench's inner ratcheting components (and its reversing member in dotted lines) as they appear when making a drive stroke with the wrench in its forward position.

FIG. 25 is a cross sectional view taken along lines 25—25 of FIG. 27.

FIG. 26 is a cross sectional view taken along lines 26—26 of FIG. 27.

FIG. 27 is a top plan view of the wrench of the FIG. 21.

FIG. 34 is a perspective view of a fifth magnetic socket-type wrench embodiment of the present invention.

FIG. 35 is an exploded perspective view showing the components of the wrench of FIG. 34.

FIG. 35a is a perspective view of the reversing member of the wrench of FIG. 34 illustrating the components thereof located on its underside.

FIG. 35b is a perspective view of a removable drive of the present invention having a ½ drive which is capable of being received and magnetically held in the drive hole of the wrench of FIG. 34.

FIG. 35c is a perspective view of a removable drive of the present invention having a ⅜ inch drive which is capable of being received and magnetically held in the drive hole of the wrench of FIG. 34.

FIG. 35d is a perspective view of a removable drive of the present invention having a ¼ inch drive which is capable of being received and magnetically held in the drive hole of the wrench of FIG. 34.

FIG. 36 is a top plan view of the wrench of FIG. 34 showing the position of the wrench's inner ratcheting components in dotted lines as they appear when making a drive stroke with the wrench in its forward position.

FIG. 37 is a cross sectional view taken along lines 36–36 of FIG. 36.

FIG. 38 is a top plan view of the wrench of FIG. 34 showing the position of the wrench's inner ratcheting components in dotted lines as they appear when making a drive stroke with the wrench in its reverse position.

FIG. 39a is a side elevation view of a chuck of the present invention which is capable of being received and magnetically held in the drive hole of the wrench of FIG. 34.

FIG. 39a' is a top plan view of the chuck of FIG. 39a.

FIG. 39b is a side elevation view of a large male-type socket of the present invention which is capable of being received and magnetically held in the drive hole of the wrench of FIG. 34.

FIG. 39b' is a top plan view of the large male-type socket of FIG. 39b.

FIG. 39c is a side elevation view of a small male-type socket of the present invention which is capable of being received and magnetically held in the drive hole of the wrench of FIG. 34.

FIG. 39c' is a top plan view of the small male-type socket of FIG. 39c.

FIG. 39d is a side elevation view of a blade-type screw bit of the present invention which is capable of being received and magnetically held in the drive hole of the wrench of FIG. 34.

FIG. 39e is a side elevation view of a Phillips-type screw bit of the present invention which is capable of being received and magnetically held in the drive hole of the wrench of FIG. 34.

FIG. 40 is a top plan of a tool kit of the present invention which includes a case and the wrench of FIG. 34 as well as a plurality of tools similar to those illustrated in FIGS. 39a–e.

FIG. 41 is a perspective view of a sixth magnetic socket-type wrench embodiment of the present invention.

FIG. 42 is an exploded perspective view showing the components of the wrench of FIG. 41.

FIG. 43 is a top plan view of the wrench of FIG. 41 showing the wrench with an end cap removed to illustrate the position of the wrench's inner ratcheting components as they appear when making a drive stroke with the wrench in the clockwise direction.

FIG. 44 is a cross sectional view taken along lines 44—44 of FIG. 43 showing, however, the view as it would appear if the end cap and a removable drive were respectively in place and received by said wrench.

FIG. 45 is a top plan view of the wrench of FIG. 41 showing the wrench with an end cap removed to illustrate the position of the wrench's inner ratcheting components as they appear when making a release stroke with the wrench in the counterclockwise direction.

FIG. 46 is a top plan view of an alternative ratchet wheel having sawtooth-like teeth for use in the wrench of FIG. 41.

FIG. 49 is a top plan view of the wrench of FIG. 47 showing the wrench with an end cap removed to illustrate the position of the wrench's inner ratcheting components as they appear when making a drive stroke with the wrench in the clockwise direction.

FIG. 50 is a cross sectional view taken along lines 50—50 of FIG. 49 showing, however, the view as it would appear if the end cap and a removable drive were respectively in place and received by said wrench.

FIG. 51 is a top plan view of the wrench of FIG. 47 showing the wrench with an end cap removed to illustrate the position of the wrench's inner ratcheting components as they appear when making a release stroke with the wrench in the counterclockwise direction.

FIG. 57 is a top plan view of a ninth embodiment of the present invention which uses pivoting pawls to engage the wheel of the ratcheting apparatus.

FIG. 58 is a top plan view of the ratcheting apparatus of FIG. 57 which shows the pivoting pawls in their released position.

FIG. 59 is a cross sectional view taken along lines 59—59 of FIG. 57 showing, however, the view as it would appear with the plate 812 encasing a pivoting pawl mounted about a pivot post 820.

FIG. 60 is a top plan view of a tenth embodiment of the present invention with the pawls pivoted on the wheel.

FIG. 61 is a top plan view of the apparatus of FIG. 60 which shows the pawls in the disengaged position.

FIG. 62 is a cross sectional view taken along lines 62—62 of FIG. 61.

DETAILED DESCRIPTION OF PREFERRED EMBODIMENTS

Figure 8:
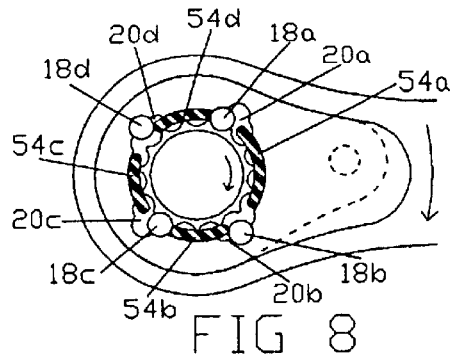
FIG. 8 is a view of the apparatus which is similar to that illustrated in FIG. 5 which shows the position of the wrench's ratcheting components as they would appear when one begins to make a drive stroke with the wrench.

FIGS. 1 through 13 illustrate a socket wrench 10 of the present invention which utilizes the unique magnetic ratchet of the present invention. As illustrated, socket wrench 10 has four basic parts, the first of which is a body referred to herein as wrench body 12, which defines a chamber 14 as shown in FIG. 2, in which a ratchet wheel 16 (the second main part) is received for rotation relative to the wrench body.

As also illustrated, the third main part or element of wrench 10 is a pawl means which, as shown in the figures, consists of four cylindrically shaped engaging members also referred to herein as pawls 18, which are received in pockets 20 of the wrench body. As shown, the pockets open into chamber 14 of the wrench body.

The fourth and last main element of wrench 10 is a ring magnet 22, also referred to and more generically covered in the claims attached hereto as the offset or magnetic means, which as shown, is mounted about the base (not numbered) of the ratchet wheel in a manner so that it is coaxially aligned with the wheel to one side thereof. As explained in more detail below, ring magnet 22 provides magnetic force which is transmitted to the ratchet wheel which attracts the pawls to the ratchet wheel, thereby in essence replacing the spring of a conventional ratchet which forces the pawl of a conventional ratchet into engagement with the teeth of a conventional ratchet wheel.

Referring now to FIGS. 3 and 7, ratchet wheel 16 is provided with a plurality, in this particular instance, twenty detents 24 which function in a manner similar to the teeth of a normal ratchet wheel. However, because the radius of curvature of detents 24 is much less than that of a conventional tooth, it will be appreciated that the ratcheting apparatus of the present invention will not click, or make a clicking noise, as loudly as a conventional ratchet. As also illustrated, the radius of curvature of the detents is such that they complement the shape of the cylindrical pawls.

As also illustrated in FIGS. 3 and 7, ratchet wheel 16 has an axially aligned, integral square socket drive 26 projecting outwardly to one side of the wheel. The square socket drive is similar to that of a conventional square drive for receiving a conventional socket. However, it will be appreciated that square drive 26 requires no mechanical means for holding a socket. As discussed in more detail below, ring magnet 22 provides enough magnetic attraction through drive 26 to securely hold a socket, and yet still enable an individual to pull the socket off the drive with relative ease.

As also shown in FIGS. 3 and 7, ratchet wheel 16 has a shoulder 28 located between its drive 26 and detents 24 for receiving a washer like end cap 30. The inner diameter of end cap 30 is dimensioned so that it is press fitted onto shoulder 28 of the ratchet wheel, and therefore securely attached thereto. Ring magnet 22 rests against end cap 30, and is held in place thereby. End cap 30 is preferably made out of steel to further enhance the magnetic attraction of a socket to the drive post. However, it is not absolutely necessary to make end cap 30 out of steel since ring magnet 22 will generally provide drive 26 will enough magnetic attraction to hold a socket in place, regardless of the material end cap 30 is made out of. The other end 32 of ratchet wheel 16 is, as illustrated, provided with a pair threaded bores, or holes 34, for receiving screws 36 to secure the assembly together.

As also shown, ring magnet 22 is provided with a cover 38 which is sized and configured to receive ring magnet 22, as well as ratchet wheel 16, through its axially positioned circular cut-out section 40. Cover 38 is preferably made from a plastic material, such as Delrin. Delrin provides a relatively friction free surface for pawls 18, the ends of which rest against the surface of cover 38, as illustrated in FIG. 3. The friction reducing Delrin surface facilitates the movement of the pawls into and out of engagement with detents 24 of the ratchet wheel, as explained in more detail below.

As previously mentioned, pawls 18 are received in pockets 20 of the chamber 14 of the wrench body 12 as best illustrated in FIG. 2. As perhaps best illustrated in FIG. 7, chamber 14 and its pockets 20 are defined by an inner surface, or wall 42, of wrench body 12.

As also illustrated in FIG. 3, Delrin cover 38 is received in a cylindrical cut-out 44 which is provided in a side 46 of wrench body 12. The other oppositely facing side of wrench body 12 identified herein as side 48 is also provided with a cut-out section 50. However, cut-out section 50 has a tear drop shape instead of the circular shape provided for cut-out section 44. As also best illustrated in FIG. 7, tear drop shaped cut-out 50 receives a tear drop shaped Delrin reversing member 52. As illustrated in FIG. 1, however, tear drop shaped reversing member 52 has a more tapered tear drop shape than cut-out 50. This enables the reversing member 52 to be pivoted between forward and reverse positions, which reverse the direction in which the wrench operates so that, for example, in the forward direction, the wrench would drive in a clockwise direction, whereas in the reverse direction, the wrench would drive in a counterclockwise direction. The importance of this and details of this are described in more detail below.

As best visualized in FIGS. 5–7, reversing member 52 is provided with four abutments or posts 54, which are equidistantly spaced from each other, roughly 90 degrees apart from each other, and which project outwardly from the underside surface of reversing member 52. Only one abutment post 54 is visible in FIG. 7. It will be appreciated, however, as shown in FIGS. 5 and 6, that four posts 54 are provided, each of which is adjacent a pocket, and positioned between the ratchet wheel and the wall 42 of the wrench body, which defines chamber 14. As such, it will be appreciated that there is a post for each pawl 18 and as explained in more detail below, the posts serve to push the pawls 18 out of engagement with the ratchet wheel when the socket wrench is rotated in the direction which enables such, as is explained in more detail below.

Returning to FIG. 7, it will be appreciated that reversing member 52 is also provided with a bore 56 near the tip of its tear drop. Bore 56 receives a cylindrical magnet 58 which, as explained in more detail below, is attracted to the inner surface 60 of the tear drop cut-out 50 in wrench body 12. Magnet 58 is provided with sufficient magnetic strength to maintain the position of reversing member 52 within tear drop shape cut-out 50 when the wrench is being used in its normal intended manner. As explained in more detail below, this enables the wrench to maintain either its forward or its reverse direction.

As further illustrated, magnet 58 is provided with a steel cap 62 which is held in place by the magnetic force of magnet 58. Steel cap 62 enables one to push cap 62 with his or her thumb quite easily and thereby move reversing member 52 to either its forward or reverse positions as explained below, or its locked position, which is located between the forward and reverse position, as illustrated in FIG. 1.

FIGS. 1 and 7 also illustrate that apparatus 10 is provided with an end cap 64 which, when assembled, abuts against reversing member 52. End cap 64 is provided with a pair of bores 66 for receiving screws 36 which, when threaded into bores 34 of ratchet wheel 16, secure all elements of the assembly together.

The operation of the wrench will now be described with reference to FIGS. 8 through 13, which depict the position of the main components of the wrench, or ratcheting apparatus, during both a drive stroke and a release stroke. As explained in more detail below, when a drive stroke is made with the wrench, two of the four pawls shown are pulled into detents of the ratchet wheel by the magnetic attraction of the ratchet wheel which is provided by ring magnet 22. The pulled pawls are then immediately sandwiched between the wrench body 12 and ratchet wheel 16 so that they engage both the wrench body and the wheel to prevent relative rotation therebetween. That is, the wrench body and ratchet wheel are both fixed or locked relative to each other during the drive stroke so that turning or rotation of the wrench body turns the ratchet wheel and its square drive 26, and thus a socket (not shown) held on the drive of the ratchet which, of course, in turn drives a bolt or nut positioned in the socket (also not shown).

During the release stroke of the apparatus, the wrench is turned or rotated in the opposite direction which causes it rotate relative to the ratchet wheel, as those skilled in the ratchet art. will appreciate. The pawls which engage the ratchet wheel during the drive stroke are pushed out of engagement therewith by the posts 54 which permits the ratchet wheel to rotate relative to the wrench body.

FIG. 8 illustrates the position of the ratcheting assembly's components at the beginning of a drive stroke. In this position, it will be appreciated that pawls 18a and 18c are engaging detents 24 of the ratchet wheel 16. Pawls 18b and 18d, however, are not engaged at this point because the pockets holding the pawls are not spaced 90 degrees equally from each other. A close inspection of the figures will reveal that pocket 20a is closer to pocket 20d than it is to pocket 20b. The actual included angle of the arc between pockets 20a and 20d is 85.5 degrees, whereas the included angle of the arc between pockets 20a and 20b is 94.5 degrees. Similarly, the included angle of the arc for pockets 20b and 20c is 85.5 degrees, whereas the included angle of the arc for pockets 20c and 20d is 94.5 degrees. Pockets 20a and 20c are, however, 180 degrees apart from each other and thus are in phase with each other which causes their respective pawls 18a and 18c to move in unison. Similarly, pockets 20b and 20d are 180 degrees apart from each other and are thus in phase with each other which causes their. respective pawls 18b and 18d to move in unison. Since ratchet wheel 16 is provided with twenty detents 24, each detent has a ratcheting arc of 9 degrees. Accordingly, half a ratcheting arc is 4.5 degrees. By positioning pockets 20a and 20d as well as pockets 20b and 20c 4.5 degrees less than 90 degrees apart from each other, or half a detent ratcheting arc distance, the two pairs of oppositely facing pockets, i.e. pocket pair 20a,c and pocket pair 20b,d are out of phase with respect to each other. This out of phase arrangement keeps their respective pairs also out of phase with respect to each other so that pawls 20a,c will not engage when pawls 20b,d engage and vice versa. This out of phase arrangement effectively provides the ratcheting wheel with forty teeth, or detents 24. Thus, by simply putting one pair of the pawls out of phase with respect to the other pair of pawls, one effectively reduces the ratcheting arc from 9 degrees to 4.5 degrees, thereby doubling the precision of the wrench, as those skilled in the art will appreciate. In other words, the wrench will engage every four-and-a-half degrees instead of every 9 degrees, thereby reducing the amount of play in the wrench before its pawls engage the ratchet wheel.

A close inspection of FIG. 8 will also reveal that the wall 42 of the wrench body defining pockets 20a,c for pawls 18a,c is also engaging pawls 18a,c. Accordingly, it will be appreciated that the pawls 18a,c are, in effect, being squeezed by the wrench body between wall 42, and the respective detents of the ratchet wheel. This squeezing action prevents the wrench body from slipping on the ratchet wheel when the wrench body is driven, or rotated in a clockwise direction, as viewed in FIG. 8. Thus, the force generated by one turning the wrench in a clockwise direction is transmitted through pawls 18a,c to the ratchet wheel which in turn causes the ratchet wheel to rotate in a clockwise direction, and thereby drive the socket (not shown) held on the ratchet wheel's drive 26 which turns a bolt, or other fastener (also not shown) held in the socket.

Figure 9:
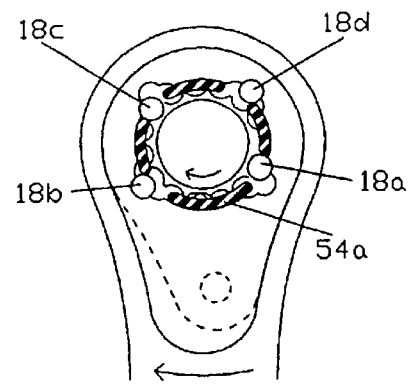
FIG. 9 shows the position of the wrench's components after having turned the wrench of FIG. 8 approximately 90 degrees.

As will be appreciated, the longitudinal axis of the wrench body in FIG. 8 is positioned in about a 3:30 o'clock position. In FIG. 9, it will be appreciated that the wrench has been turned to approximately a six o'clock position. It will be appreciated that pawls 18a,c are still engaged and sandwiched between the inner wall 42 of the wrench body, and the same detents 24 shown in FIG. 8.

Figure 10:
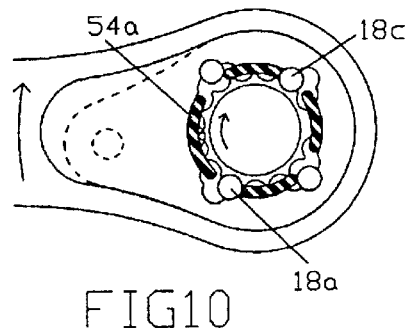
FIG. 10 shows the position of the wrench's ratcheting components as they appear after the wrench has been rotated another 90 degrees from its position in FIG. 9.

FIG. 10 illustrates the position of the wrench at approximately a nine o'clock position. It will be appreciated that pawls 18a,c are still engaged and in position to transmit force via the wrench body to the ratchet wheel.

Figure 11:
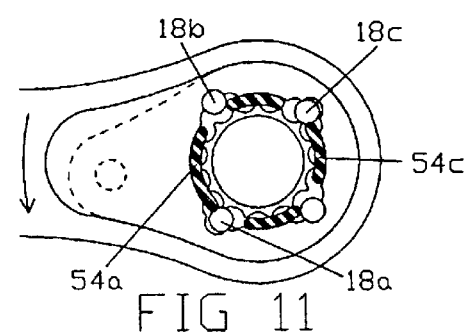
FIG. 11 shows the position of the wrench's ratcheting components as they would appear as one begins to make a counterclockwise return or release stroke with the wrench after completing the drive stroke as shown in FIG. 10.

FIG. 11 illustrates the position of the wrench body at about an 8:30 o'clock position, just after one begins making a release, or return stroke with the wrench body. It can be seen in FIG. 11 that pawls 18a,c have moved out of their respective detents. It can also be seen that pawls 18a,c are being contacted respectively by abutment posts 54a,c which serve to push the pawls out of engagement with the detents of the ratchet wheel. As also shown, abutment posts 54b,d are similarly pushing pawls 18b,d to prevent them from engaging a detent of the ratchet wheel.

Figure 12:
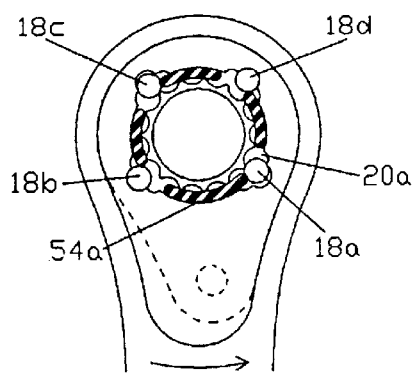
FIG. 12 illustrates the position of the wrench's ratcheting components about halfway through the wrench's release stroke which as illustrated is roughly how they would appear after rotating the wrench in a counterclockwise direction another 90 degrees from its position in FIG. 11.

FIG. 12 illustrates continued movement of the wrench body during the return or release stroke. Again, it will be seen that none of the pawls 18a–d are engaging a detent of the ratchet wheel. Thus, it will be appreciated that the position of the ratchet wheel is unchanged in FIGS. 11 and 12. However, the wrench body has rotated approximately almost 90 degrees relative to the ratchet wheel in the counterclockwise direction.

Figure 13:
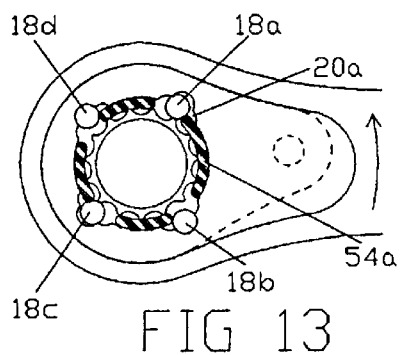
FIG. 13 shows the position of the wrench's ratcheting components at about the end of the release stroke which as shown is how they would appear after having rotated the wrench body approximately another 90 degrees in the counterclockwise direction.

FIG. 13 illustrates continued counterclockwise movement of the wrench body another 90 degrees from its position in FIG. 12 so that it now has approximately a three o'clock position. Again, it will be appreciated that none of the pawls 18a–d is engaging a detent of the ratchet wheel. It will also be appreciated that abutment posts 54a–d are pushing their respective pawls to prevent them from engaging a detent of the ratchet wheel. Due to the magnetic attraction of the ratchet wheel provided by ring magnet 22, the pawls will roll into and out of each detent (and make a slight clicking sound) as the wrench body is rotated but they will not engage the ratchet wheel and/or sandwich themselves between the wrench body wall 42 and the ratchet wheel as long as rotation continues in the counterclockwise direction. However, if one now begins to make a clockwise drive stroke with the wrench body, and move the wrench body to the position illustrated in FIG. 8, pawls 18a,c will again engage detents of the ratchet wheel, thereby enabling one to drive the ratchet wheel. It is to be understood that pawls 18*b,d* could also engage the wheel. Which pair of pawls actually engages the wheel depends on their positioning at the beginning of a drive stroke. Generally, the pair which is closest to engagement at the beginning of a drive stroke will be the pair which actually engages the detents of the wheel.

From the foregoing, it will also be appreciated that the pockets' shape is designed (or sized and configured) to facilitate movement of the pawls into and out of engagement with the detents 24 of the ratchet wheel and wall 42 of the wrench body. Wall 42, of course, also defines the pockets' shape.

While ratchet 10 is provided with a ring magnet 22, it is to be understood that ring magnet 22 could be dispensed with by making the pawls out of magnetic material themselves. Such a magnetic pawl could also be cylindrical and, in fact, could be very similar to magnet 58 shown in the figures. However, magnetic pawls made out of conventional ceramic material such as magnet 58 are not likely to be as strong as the steel pawls 18 which are preferably made from a tempered or cold worked steel. Ceramic magnets are also believed to be much more brittle than steel, and thus might not be able to withstand the forces being transmitted through them. In some applications, however, they may work fine. For example, in some applications, it may be desirable to make the ratchet wheel and wrench body out of a non-magnetic material such as aluminum. In this case, the ring magnet could be replaced with a steel washer affixed to the ratchet wheel which would attract the magnetic pawls and generally restrain their movement but allow them to be pushed into and out engagement between the ratchet wheel and the wall of the wrench body, or other force transmitting body. The wall could be designed so that it would move or push the pawls into engagement with the ratchet wheel. Abutment posts could also be designed perhaps out of the wall itself to push the pawls out of engagement with the ratchet wheel. This type of ratcheting mechanism would also offer the advantage of being almost completely silent, since there would be no magnetic force pulling the pawls into the ratchet wheel during a return stroke which is what causes the clicking noise associated with most conventional ratchets. In other words, once the pawls are pushed into the release position, they will remain in position until they are pushed back into engagement with the ratchet wheel. Such a silent ratchet may appeal to the military and may be of particular use in submarines where it is extremely important to avoid detection by an enemy.

FIGS. 5 and 6, as well as 7, illustrate the reversing mechanism or means of wrench 10 which reverses the direction in which the wrench operates. FIG. 5 illustrates the position of the wrench's components in its forward position, which those skilled in the art will appreciate is the position the wrench is in as shown in FIGS. 8 through 13. In this position, it will be appreciated that a drive stroke is made with the wrench by rotating it in a clockwise direction as indicated by the arrow in FIG. 5. In FIG. 6, it will be appreciated that the drive stroke is made by rotating the wrench in the counterclockwise direction as indicated by the arrow in FIG. 6.

A review of FIGS. 5 and 6 also illustrates that the reversing means of the wrench is provided by the tear drop shaped reversing member 52 which, when pushed to the right as shown in FIG. 5, puts the wrench in its forward position. In this position, it will be appreciated that abutment posts 54 are moved in a slight clockwise direction so that the right ends of the posts project slightly into the left sides, or ends, of pockets 20. Similarly, when reversing member 52 is moved to the left to its reverse position shown in FIG. 6, the left ends of posts 54 project into the right side of pockets 20. This repositioning of the posts is what causes the mechanism to reverse the wrench's direction of operation since it is the protruding ends of posts 54 which push the pawls out of engagement with the ratchet wheel when a return stroke is made with the wrench. Thus, it will be appreciated that when the wrench is in its forward position illustrated in FIG. 5, the right ends of the abutment posts push the pawls out of engagement when the wrench is rotated in a counterclockwise direction, which is the direction the wrench makes when one is making a return stroke with the wrench. Similarly, in FIG. 6, it will be appreciated that it is the left end of the abutment posts which push the pawls out of engagement with the ratchet wheel when a clockwise return or release stroke is made with the wrench.

As also shown in FIG. 5, each pawl 18*a* and *c* is engaging a detent of the ratchet wheel, and the trailing side wall of its pocket (which sidewall is part of wall 42). It will be appreciated that the pawl actually engages the trailing sidewall of the pocket (which as viewed in FIG. 5, is the right side of the pocket when looking at the pocket from the outside of the ratchet wheel) since the wrench is being moved in a clockwise direction. Thus, it will be appreciated and is believed that as one rotates the wrench in a clockwise direction, the trailing sidewall of the pocket impacts up against the pawl as the pawl is pulled into a detent 24 of the ratchet wheel by the magnetic attraction of the wheel as previously described. At this point, it is believed that the pawl becomes sandwiched between the pocket's trailing sidewall and a ratchet wheel detent to thereby engage both the wrench body and the ratchet wheel which locks the wrench body into engagement with the ratchet wheel, thereby enabling one to make a drive stroke with the wrench. As previously mentioned, in this position, the driving forces are transmitted from the wrench body through the engaged pawl to the ratchet wheel. The same engagement operation is believed to take place in FIG. 6, but in the opposite direction.

Reversing member 52 is also preferably made out of a friction reducing material, such as Delrin, because the pawls also slide on this surface as they move into and out of engagement as one makes drive and return strokes with the wrench. Delrin also facilitates movement of reversing member 52 between its forward and reverse positions as illustrated in FIGS. 5 and 6.

Magnet 58 received in bore 56 of reversing member 52 serves to hold or maintain reversing member 52 in the desired forward or reverse position after it is moved to the desired position. Magnet 58 holds member 58 in position due to its magnetic attraction to the underlying metallic surface 60 of tear drop shaped cut-out 50. Magnet 58 is preferably a ceramic type magnet having a magnetic force designated in the industry as C5. Ring magnet 22 is also preferably a ceramic magnet, and has the industry designation of C5. It is believed that the stronger C8 magnets would also work quite well.

The wrench body 12, and the ratchet wheel 16 are preferably made from 01 tool steel, and then heat treated to provide them with the desired temper, as is well known to those skilled in the art. Pawls 18 are preferably made from steel rod stock by simply cutting each pawl from the rod stock at its desired length. It has also been found that spherically shaped pawls such as steel ball bearings can also be used in this embodiment of the present invention as well as the other embodiments described herein and indeed can be substituted for the illustrated cylindrically shaped pawls.

In addition, it has been found that the ratcheting apparatus of wrench 10 will work with just one pawl in one of the illustrated pockets 20 as well as two pawls which may be in two of the out of phase pockets such as pockets 20*a* and 20*b* or in two of the in phase pockets such as pockets 20*a* and 20*c*.

FIGS. 14 through 19 illustrate another embodiment of the present invention for a socket wrench 110. Socket wrench 110 is quite similar to socket wrench 10 in that it is provided with a wrench body 112 defining a chamber 114 for housing a ratchet wheel 116. As will be appreciated, however, chamber 114 has a triangular shape since its pockets or corners 120*a–c* hold only three pawls 118*a–c* instead of the four pawls 18*a–d* provided in the first embodiment. Pockets 120*a–c* are also much less defined than the four .pockets 20*a–d* of the first embodiment. They are, however, large enough to receive pawls 118*a–c*, and permit movement of the pawls into and out of engagement with the detents 124 of ratchet wheel 116 in a manner similar to that which takes place in the first embodiment. As will be appreciated, the simple triangular shape of chamber 114 of this embodiment enables the chamber to be easily machined or otherwise provided since it is a simple equilateral triangle provided with filleted or rounded corners having a radius of curvature of 0.25 inches. As will be appreciated, the filleted corners define the walls of pockets 120*a–c*.

Pawls 118*a–c* illustrated in solid lines in FIG. 16 are shown in their drive position in which one of the pawls, i.e. pawl 118*b*, is engaging the ratchet wheel. The pawls shown in dotted lines are in their disengaged, or release position, which is the position they would be in when one is making a return stroke with the socket wrench. The reason only one pawl, i.e. pawl 118*b*, is engaging the ratchet wheel is because the pawls are out of phase with respect to each other such that only one of the three pawls will engage a detent 124 of the ratchet wheel at any given time. This out of phase engagement occurs even though the pawls are spaced equally from each other by the equilateral triangularly shaped chamber 114 because the ratchet wheel is provided with twenty detents which is a number not evenly divisible by three. If the ratchet wheel were provided with 24 detents, all three pawls 118*a–c* would engage detents of the ratchet wheel simultaneously, since with 3 pawls there would be effectively one pawl for every eight detents. Those skilled in the art will appreciate that this out of phase arrangement effectively provides this embodiment with three times the number of detents, or 60 detents which provides the socket wrench with a ratcheting arc of only 6 degrees. Thus, the ratchet of this embodiment is a very precise ratchet which will engage its ratchet wheel with just a slight turn of the socket wrench.

Referring now to FIGS. 15 and 18, it will be appreciated that ratchet wheel 116 is received in an end cap 130 and secured thereto by a ledge 131 of the ratchet wheel's square drive 126. FIGS. 15 and 18 further illustrate that a ring magnet 122 is also provided which rests against end cap 130 as best shown in FIG. 15. Ring magnet 122 functions in a manner similar to ring magnet 22 of the first embodiment to magnetize ratchet wheel 116 so that its drive 126 magnetically holds a socket and its wheel portion with detents 124 attracts pawls 118*a–c* into engagement therewith. FIGS. 15 and 18 also illustrate that this embodiment is provided with a cover or reversing member 138 which has a cylindrically shaped cut-out portion 139 for receiving ring magnet 122. Reversing member 138 functions similarly to cover 138 of the previous embodiment and is preferably made from a friction reducing material such as Delrin since pawls 118*a–c* move on the surface of its circular raised portion 140, as will be appreciated from viewing FIGS. 15 and 19. As explained below, however, reversing member 138 also incorporates the functions of reversing member 52 of the first embodiment.

As shown in FIG. 19, reversing member 138 is also provided with a trio of abutment posts 154*a–c* on its circular raised portion 140 which function similarly to posts 54*a–d* of the first embodiment, by moving or pushing pawls 118*a–c* into their release position when a return stroke is made with the socket wrench. As previously mentioned, the release or disengaged position of pawls 118*a–c* is illustrated in dotted lines in the figures.

Returning to FIGS. 15 and 18, it will be appreciated that raised circular portion 140 of reversing member 138 is received in a circular cut-out section 144 of wrench body 112. Wrench body 112 also defines a cut-out area 162 which opens into cut-out section 144. As shown, cut-out section 162 has a sidewall, the right side of which is referred to herein as right sidewall 163*a* and the left side of which is referred to as left sidewall 163*b*.

As shown in FIGS. 15 and 19, the underside (not numbered) of reversing member 138, is also provided with a cut-out area 157 for receiving approximately half of a magnet 158. The other half of magnet 158 is received in the cut-out section 162 of the wrench body as best shown in FIG. 15. Magnet 158 functions in a manner similar to that of magnet 58 of the previous embodiment by locking or maintaining reversing member 138 in its forward or reverse position, as respectively illustrated in FIGS. 16 and 17. However, it has been found that it works significantly better than magnet 58, since instead of attracting itself to the bottom surface of the cut-out (which in the first embodiment is surface 60) magnet 158 is positioned on its side against the bottom of cut-out section 162 so that the exposed halves of the magnet's ends 159, 161 are attracted respectively to the right and left sidewall 163*a,b* of cut-out section 162. As will be appreciated, this arrangement of the magnet enables its magnetic force to literally snap or pull reversing member 138 into its forward and reverse positions as the magnet approaches right or left sidewall 163*a* or 163*b*. Accordingly, it is not necessary to push the reversing member all the way to its forward or reverse position. Once one moves the reversing member near the forward or reverse position, the magnetic force of magnet 158 takes over to pull the reversing member into the forward or reverse position. This magnetic switching arrangement is believed to be another novel feature of the present invention and may be of use in many applications besides its illustrated use in a ratchet. For example, it is believed that it would work extremely well in a conventional electrical wall switch in that it is unlikely to wear out, which is in complete contrast to conventional electrical wall switches which often wear out quickly.

FIG. 16 illustrates wrench 110 in its forward position in which end 159 of magnet 158 is in contact with right sidewall 163*a*. As illustrated by the arrow, a drive stroke is made in this position by rotating or turning the wrench in a clockwise direction. FIG. 17 illustrates socket wrench 110 in its reverse position in which the magnet's other end 160 is attracted to and in contact with sidewall 163*b*. As illustrated by the arrow, in this position a drive stroke is made by turning the wrench in the counterclockwise direction.

Returning now to FIGS. 15 and 18, it will be appreciated that the entire assembly is held together by an end cap 164 with a screw 136 received therein and threaded into a threaded bore 134 provided in the end (not numbered) of ratchet wheel 116. As also shown, end cap 164 is received in a cut-out section 165 located on side 148 of the wrench body. End cap 164 is also preferably made out of a friction reducing material such as Delrin to facilitate movement of the pawls into and out of engagement with the ratchet wheel which are positioned against the inner facing side 166 of the end cap as illustrated.

FIG. 20 illustrates yet another embodiment of the present invention, which is identical to that illustrated in FIGS. 14 through 19, with the exception that ratchet wheel 116, referred to herein as wheel 216, has a smooth cylindrical surface 217 which is not provided with any detents. It will thus be appreciated that this embodiment is more like a clutch, particularly a roller clutch, since this embodiment relies on friction to prevent movement between the wheel and the wrench body.

By providing the ratchet wheel with a smooth detent-free surface, it will be appreciated that all three pawls 218a–c engage surface 217 simultaneously and therefore prevent ratchet wheel 216 from rotating relative to wrench body 212 during a drive stroke by in essence squeezing the wheel. It will be appreciated that the friction which is generated during a drive stroke between the wheel's surface 217 and the surfaces of the three pawls 218a–c should be sufficient to prevent such rotation. It will further be appreciated that the force of a drive stroke is transmitted through all three pawls in this embodiment which means that wrench 210 will be able to withstand significant forces.

The simultaneous engagement of surface 217 by pawls 218a–c is shown in FIG. 20 by the pawls drawn in solid lines. The pawls drawn in dotted lines show the pawls in their disengaged release position. As will be appreciated, there will be no clicking noise during a return stroke with this embodiment since there are no detents for the pawls to click against as the pawls travel over surface 217 during the return stroke.

The remainder of the components of socket wrench 210 are identical to those of socket wrench 110, and accordingly are numbered similarly such that reference numerals sharing the same last two digits identify similar corresponding elements.

FIGS. 21–33 illustrate a fourth embodiment of the present invention for a socket wrench 310. Socket wrench 310 is quite similar to socket wrench 10 in that it is provided with a wrench body 312 defining a chamber 314 for housing a ratchet wheel 316. Four pawls 318a–d are also utilized as well as four corresponding pockets 320a–d. In this embodiment, however, only one of pawls 318a–d engages the wheel at any given time.

FIG. 23 illustrates wrench 310 in its reverse drive position in which it can be seen that only one of the pawls, i.e. pawl 318c, is engaging a detent 324 of the ratchet wheel. The other pawls are not engaging the wheel. Pawl 318b is received in a detent 324 but it is not being engaged (or squeezed) by the wall of pocket 320b as it must be for engagement as previously described.

This embodiment is designed to have only one of four pawls engage the wheel at any given time so that the wheel is effectively provided with four times its actual number of detents which in this embodiment means that the wheel effectively has 60 detents since it actually has 15 detents. The reason only one pawl engages the ratchet wheel at any given time is because the pawls are out of phase with respect to each other. The out of phase arrangement is provided in a manner similar to that of pawls 118 by equidistantly spacing the pockets and by providing the wheel with a number of detents (in this case fifteen) which is a number not evenly divisible by four, i.e. the number of pawls in this embodiment. If the ratchet wheel were provided with 16 detents, all four pawls 318a–d would engage detents 324 of the ratchet wheel simultaneously, since with 4 pawls there would be effectively one pawl for every four detents. As previously mentioned, this out of phase arrangement effectively provides this embodiment with four times the number of detents, or 60 detents which means the socket wrench has a ratcheting arc of only 6 degrees.

Referring now to FIGS. 22, 25 and 26, it will be appreciated that ratchet wheel 316 has a square cut-out section 317 for mounting the wheel on a square ledge 329 of an end cap 330 which as shown is axially aligned with wheel 318. End cap 330 is received in a cut-out section 365 located on side 348 of the wrench body. Wheel 318 as previously mentioned is positioned inside, i.e. centered in, chamber 314 along with pawls 318a–d which are respectively received in their corresponding pockets 320a–d.

A reversing member 338 is also provided which is similar to reversing member 138 of the second embodiment in that it is provided with (1) a raised circular portion 340 which is received in a circular cut-out section 344 of wrench body 312 and (2) a cylindrically shaped cut-out portion 339 for receiving ring magnet 322. In addition, as best shown in FIG. 22a, reversing member 338 is provided with abutment posts 354a–d on its circular raised portion 340 which function similarly to posts 154a–c of the second embodiment, i.e. to move or push pawls 318a–d into their release position when a return stroke is made with the socket wrench. Reversing member 338 is also preferably made from a friction reducing material such as Delrin since pawls 318a–d move on the surface of its circular raised portion 340, as they do on raised portion 140 of reversing member 138.

Unlike reversing member 138, reversing member 338 is additionally provided with a second raised portion 341 which is positioned inside abutment posts 354, as best shown in FIG. 22a. Raised portion 341 increases the distance between magnet 322 and wheel 318 relative to the distance between magnet 322 and the pawls. The importance of this is not completely understood but without it there was no magnetic attraction between the pawls and the wheel. Thus, the pawls would not move into engagement with the wheel. It is believed that by providing raised portion 341 and thus increasing the distance between the magnet and the wheel, the pawls and wheel (now being separated from the magnet by different distances) are thereby magnetized to different levels, i.e. unequally magnetized. As such, they attract each other. When they are evenly or equally magnetized by magnet 322 (i.e. without using raised portion 341), the magnetic attractive forces apparently cancel each other. Thus, the pawls and wheel are not attracted to each other. Whatever the reason, the provision of raised portion 341 is believed to be necessary at least in this embodiment. It is apparently not necessary in the first three embodiments since the wheel has a smaller diameter and is more directly connected to the magnet by virtue of the fact that the magnet is mounted on the wheel.

Returning to FIG. 22, it can be seen that wrench body 312 also defines a cut-out area 362 similar to cut-out area 162 of the second embodiment but not opening into cut-out section 344. Cut-out area 362 receives half of a magnet 358, the other half of which is embedded in reversing member 338 in a manner similar to magnet 158 of the second embodiment. Magnet 358 functions in a manner identical to magnet 158 by magnetically locking reversing member 338 in its forward or reverse position, as such is respectively illustrated in dotted lines in FIGS. 24 and 23 and previously described in connection with the second embodiment.

As also shown, ring magnet 322 rests against an end cap 366 which in turn rests against an underside edge surface 331 of drive 326. It will be appreciated, however, that unlike the drives of the first three embodiments drive 326 is not provided with an integral ratchet wheel at its end 370. Instead, end 370 is inserted into the cut-out 317 of wheel 316 which is sized and configured to snugly or tightly receive end 370. It will also be appreciated that the entire assembly is held together with a single screw 336 which passes through a hole 372 of end cap 330 and is threaded into a threaded bore 334 provided in end 370 of drive 326 to secure the assembly together.

Ring magnet 322 functions in a manner similar to ring magnets 22, 122 of the earlier embodiments in that it magnetizes ratchet wheel 316 and pawls 318 so that they attract each other. It also magnetizes drive 326 and preferably end cap 366 as well (as it preferably does in the second embodiment) so that they are capable of magnetically holding a socket mounted on drive 326.

In accordance with an important aspect of the invention, FIG. 26 illustrates that ring magnet 322 and pawls 318 are positioned or oriented relative to each other such that the lines of magnetic force or attraction therebetween (not shown but will be appreciated to extend between ring magnet 322 and pawls 318) at an angle, actually perpendicular, to the direction in which force is transmitted via pawls 318 between wrench body 312 and wheel 316 when a drive stroke is made with the wrench. This direction of force transmission will be appreciated to lie in the plane identified by the letter F (also referred to herein as force transmission plane F). It will also be appreciated that the lines of magnetic force or attraction are provided at this angle or perpendicular orientation by positioning ring magnet 322 to the side of wheel 316. It will further be appreciated that this positioning of the ring magnet to the side of wheel 316 means that the magnet is positioned out of plane F or isolated therefrom which is important since it insures that most, if not all, of the force being transmitted between the wrench body and wheel via the pawls bypasses the magnet. This is important because permanent magnets are quite brittle and often unable to withstand the forces being transmitted during the making of a drive stroke with the wrench.

Figure 28:
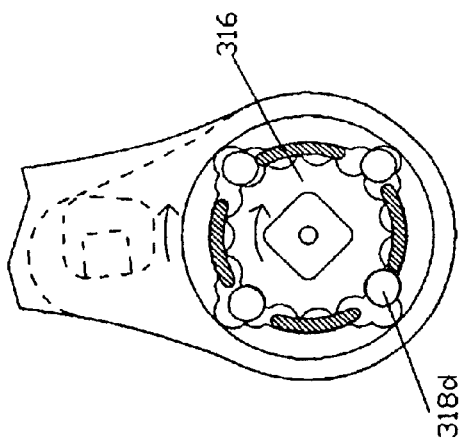
FIG. 28 is a view of the wrench of FIG. 21 which is similar to that of FIG. 24 which shows the position of the wrench's ratcheting components as they would appear when one begins to make a drive stroke with the wrench.

FIGS. 24 and 28 illustrate wrench 310 in its forward position. As illustrated by the arrow on the wrench body, a drive stroke is made in this position by rotating or turning the wrench in a clockwise direction. As shown, pawl 318*d* is engaging a detent 324 of the ratchet wheel 316. A close inspection of FIG. 28 will also reveal that the wall of pocket 320*d* is also engaging pawl 318*d*. Accordingly, it will be appreciated that the pawls 318*d* is, in effect, being squeezed by the wrench body between the wall, and the detent of the ratchet wheel. This squeezing action serves to prevent the wrench body from slipping on the ratchet wheel when the wrench body is driven.

It will be appreciated that detents 324 of this embodiment are deeper than those of the previous embodiments. The deeper detents serve to prevent the wrench body from slipping on the wheel which was found to be a problem in the previous embodiments. While detents 324 of this embodiment are deeper than those of the previous embodiments it is believed that detents shallower than detents 324 will work in many applications. The ability to use shallower detents is generally advantageous since it allows for the placement of more detents on the wheel which serves to reduce the wrench's ratcheting arc.

Figure 29:
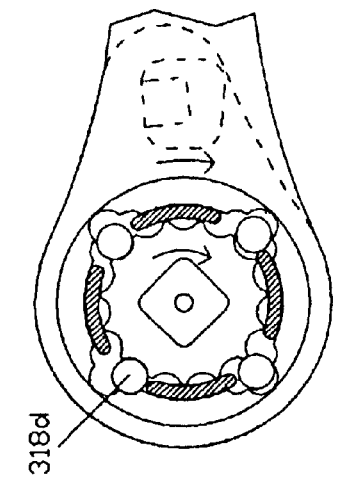
FIG. 29 shows the position of the wrench's components after having turned the wrench of FIG. 28 approximately 90 degrees.

Returning to FIG. 28 which shows the components of the ratchet at the beginning of a typical drive stroke, it will be appreciated that the longitudinal axis of the wrench body is in about a 12:00 o'clock position. In FIG. 29, it will be appreciated that the drive stroke with the wrench has been continued in the clockwise direction to approximately a three o'clock position. It will be appreciated that pawl 318*d* is still engaged and sandwiched between the wall of pocket 320*d*, and the same detent 24 shown in FIG. 28.

Figure 30:
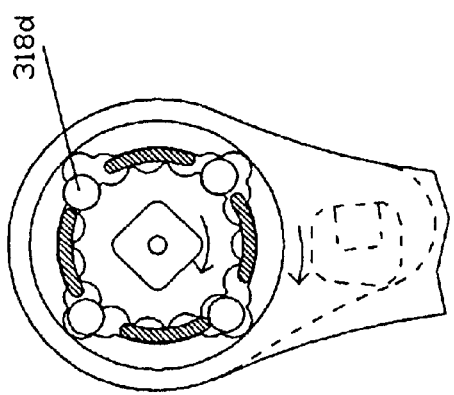
FIG. 30 shows the position of the wrench's ratcheting components as they appear after the wrench has been rotated another 90 degrees from its position in FIG. 29.

FIG. 30 illustrates the position of the wrench at approximately a six o'clock position which is where it might be at the end of a typical drive stroke. It will be appreciated that pawl 318*d* is still engaged and in position to transmit force via the wrench body to the ratchet wheel.

Figure 31:
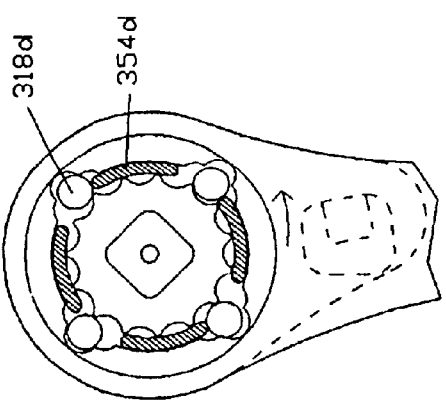
FIG. 31 shows the position of the wrench's ratcheting components as they would appear as one begins to make a counterclockwise return or release stroke with the wrench after completing the drive stroke as shown in FIG. 30.
Figure 47:
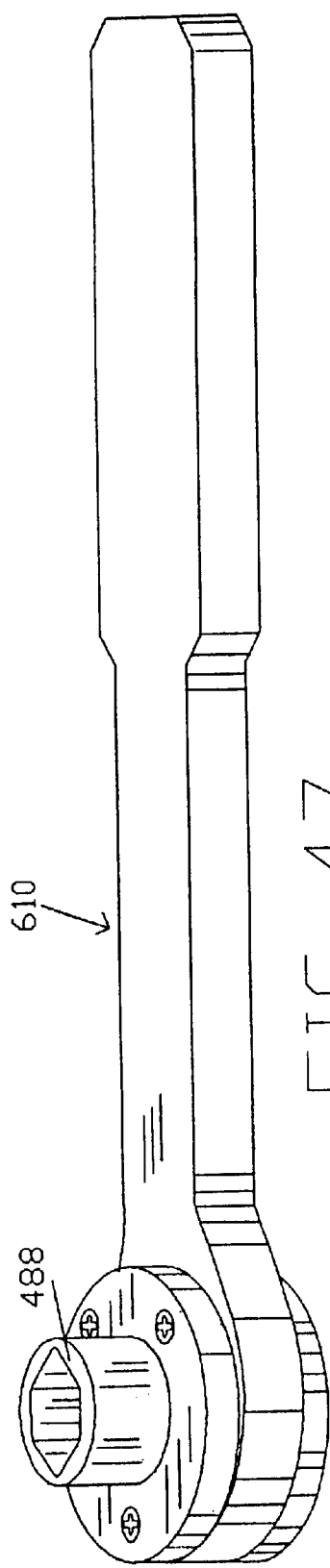
FIG. 47 is a perspective view of a seventh magnetic socket-type wrench embodiment of the present invention.
Figure 48:
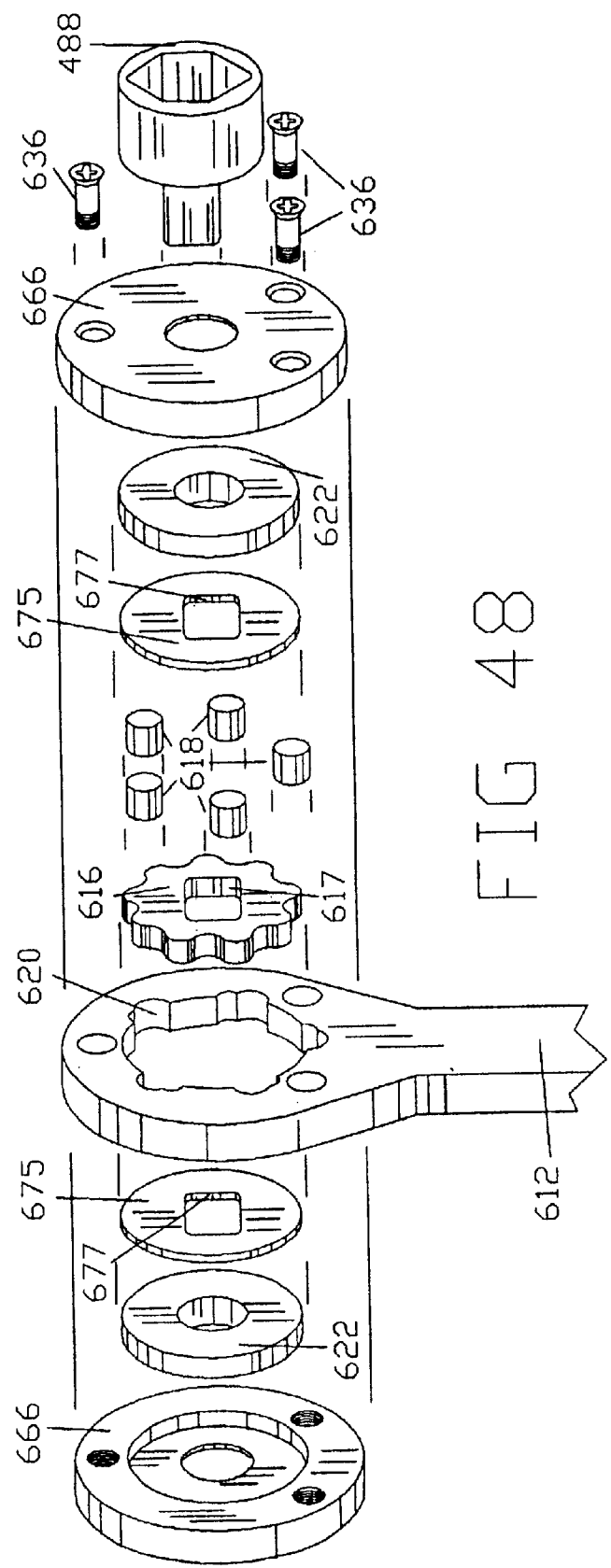
FIG. 48 is an exploded perspective view showing the components of the wrench of FIG. 47.
Figure 52:
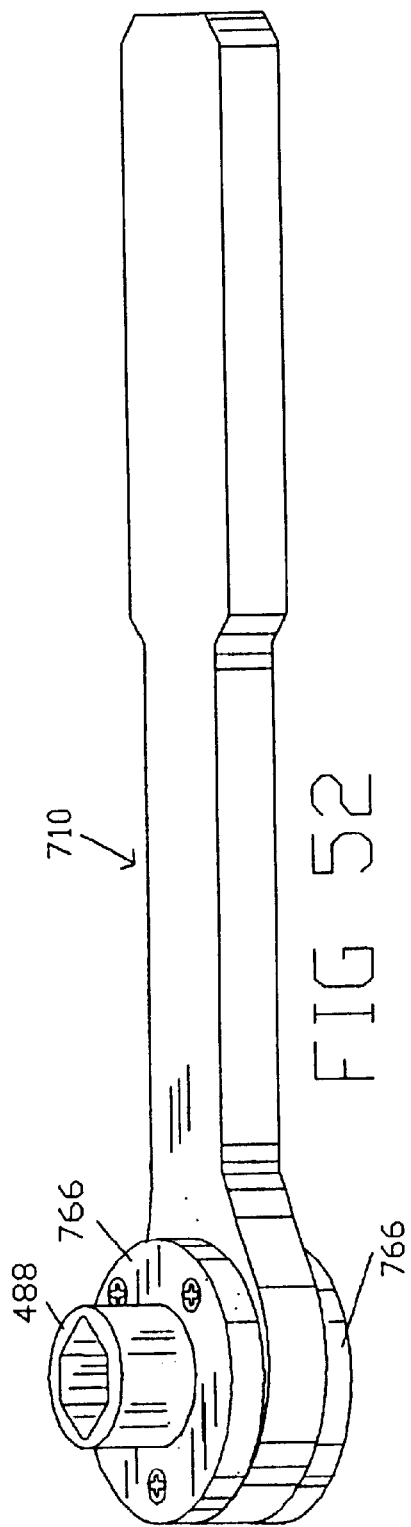
FIG. 52 is a perspective view of an eighth magnetic socket-type wrench embodiment of the present invention.
Figure 53:
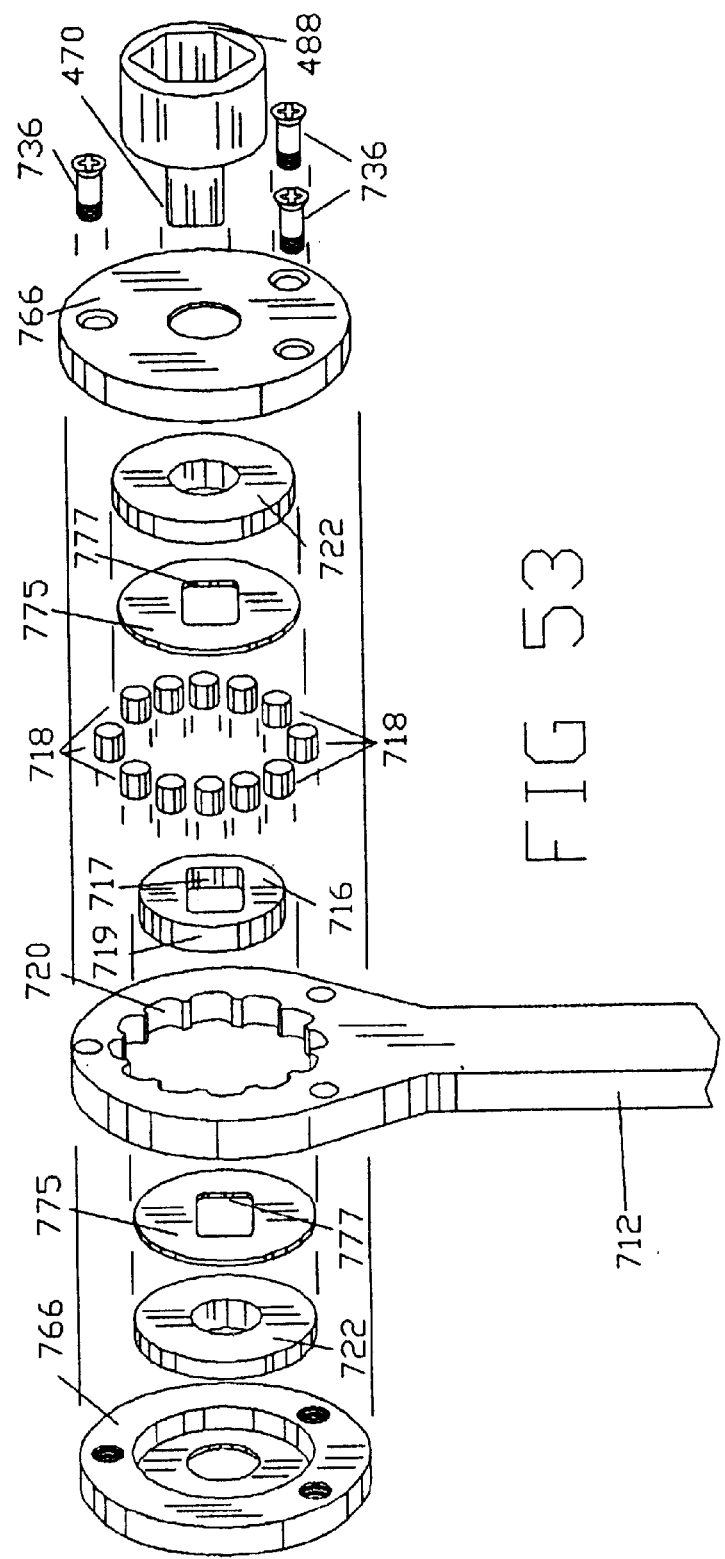
FIG. 53 is an exploded perspective view showing the components of the wrench of FIG. 52.
Figure 55:
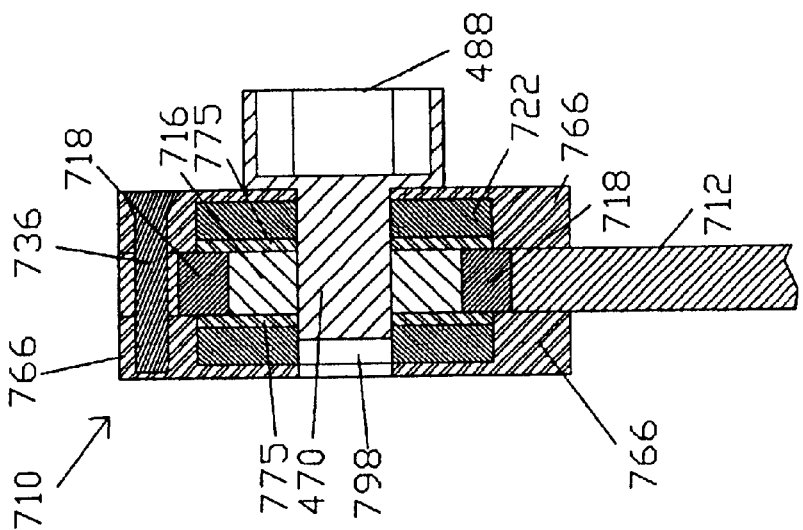
FIG. 55 is a cross sectional view taken along lines 55—55 of FIG. 54 showing, however, the view as it would appear if the end cap and a removable drive were respectively in place and received by said wrench.

FIG. 31 illustrates the position of the wrench body at about a 5:30 o'clock position, just after one begins making a release, or return stroke with the wrench body. It can be seen in FIG. 31 that pawl 318*d* has moved out of the detent it was in when it was engaging wheel 316. It can also be seen that pawl 318*d* is being contacted by abutment post 354*d* which serves to push the pawl out of engagement with the detents of the ratchet wheel. As also shown, abutment posts 354*a–c* are similarly pushing pawls 318*a–c* to prevent them from engaging a detent of the ratchet wheel.

Figure 32:
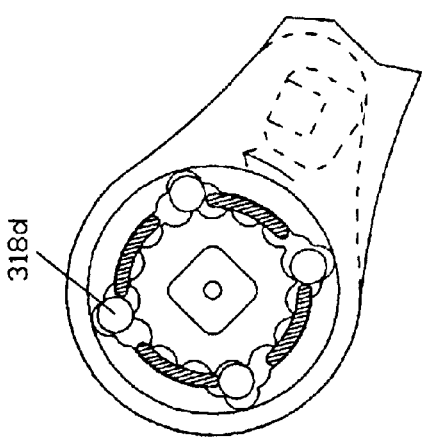
FIG. 32 illustrates the position of the wrench's ratcheting components about halfway through the wrench's release stroke which as illustrated is roughly how they would appear after rotating the wrench in a counterclockwise direction another 45 degrees from its position in FIG. 31.

FIG. 32 illustrates continued movement of the wrench body during the return or release stroke. Again, it will be seen that none of the pawls 318*a–d* are engaging a detent of the ratchet wheel. Thus, it will be appreciated that the position of the ratchet wheel is unchanged in FIGS. 31 and 32, even though the wrench body has rotated approximately almost 60 degrees relative to the ratchet wheel in the counterclockwise direction.

Figure 33:
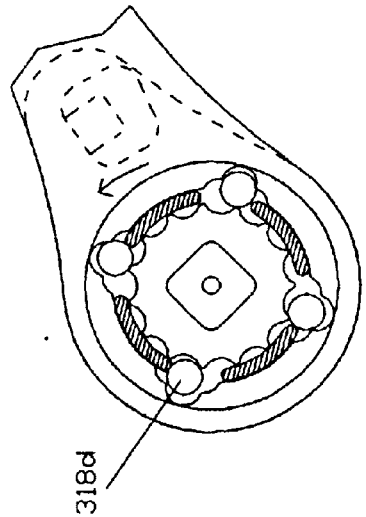
FIG. 33 shows the position of the wrench's ratcheting components at about the end of the release stroke which as shown is how they would appear after having rotated the wrench body approximately another 45 degrees in the counterclockwise direction.

FIG. 33 illustrates continued counterclockwise movement of the wrench body another 60 degrees from its position in FIG. 32 so that it now has approximately a two o'clock position. Again, it will be appreciated that none of the pawls 318*a–d* is engaging a detent of the ratchet wheel. It will also be appreciated that abutment posts 354*a–d* are pushing their respective pawls to prevent them from engaging a detent of the ratchet wheel. Due to the magnetic attraction of the ratchet wheel provided by ring magnet 322, the pawls will roll into and out of each detent (and make a slight clicking sound) as the wrench body is rotated but they will not engage the ratchet wheel and/or sandwich themselves between the wrench body wall 42 and the ratchet wheel as long as rotation continues in the counterclockwise direction. However, if one now begins to make a clockwise drive stroke with the wrench body, and move the wrench body to the position illustrated in FIG. 28, one of the pawls 318 will again engage a detent of the ratchet wheel, thereby enabling one to drive the ratchet wheel.

FIGS. 34–40 illustrate a fifth embodiment of the present invention which is directed to a ratchet wrench 410 having a removable drive 426. Those skilled in the relevant art will appreciate that wrench 410 which is preferably provided with three removable drives, i.e. ½ removable drive 426*a*, ⅜ inch removable drive 426*b* and ¼ inch removable drive 426*c* can replace a full ratchet set which typically has three separate ratchet wrenches, i.e. one with a ½ inch drive, one with a ⅜ drive and one with a ¼ drive.

The magnetic ratchet of the present invention facilitates the provision of a removable drive member since it utilizes the magnetic force of the ring magnet 422 to magnetically hold the end 470 of the removable drive 426 in the square cut-out 417 of the wheel 416. To remove the drive from the wrench, one simply pulls the drive out of the wrench which is easily performed by simply grabbing its exposed end and pulling on it.

The components of ratchet wrench 410 are very similar to those of wrench 310 with the previously described exception that drive 426 is removable. To make the drive removable, the means for holding the ratchet assembly together had to be changed. However, as those skilled in the art will appreciate this only required two basic changes. One, the section of the wrench referred to as integral end 430 which corresponds with end cap 330 was made integral with the wrench body 412. Two, the screw 336 and its location was changed by replacing it with three screws 436 which extend through end cap 466 and thread into threaded holes 467 provided in the wrench body as illustrated. Bores 480 were also provided in reversing member 438 through which spacers 482 extend which in turn receive screws 436. The spacers serve to prevent over tightening of screws 436 which if tight enough might prevent pivoting of the reversing member between its forward and reverse position. It will also be appreciated that bores 480 are somewhat elongated or slot-like which also facilitates pivotal movement of the reversing member between its forward and reverse position.

The end result of the aforementioned changes is that the axially aligned holes of the wrench's components (i.e. cut-out 417 of wheel 426, hole 443 of the reversing member 438, hole 423 of ring magnet 422 and hole 469 of cap 466) collectively define a drive hole 498 (See FIG. 40) for receiving end 470 of one of the drive 426a–c.

It also needs to be mentioned that if cap 466 is made out of magnetizable material such as steel which is preferred since this helps to magnetically attract and hold a socket on the drive, spacers 482 need to be made out of non-magnetic material such as stainless steel or Delrin. This is apparently necessary to prevent the ring magnet from magnetizing the wrench body. If this happens, the pawls will not be attracted to the wheel and thus will not engage the wheel. Surprisingly and inexplicably, screws 436 can still be made out of magnetizable material such as steel. For whatever reason, the screws do not seem to magnetize the wrench body even though they are in direct contact with the wrench body and cap 466.

FIG. 36 shows the position of the wrench's components when reversing member 438 is in its forward position and a drive stroke is being made with the wrench. As shown, pawl 418c is engaging a detent 424 of the wheel. FIG. 38 shows the position of the wrench's components when reversing member 438 is in its reverse position and a drive stroke is being made with the wrench. As shown, pawl 418a is engaging a detent 424 of the wheel.

FIGS. 39a–e illustrate five drive members of the present invention, all of which have drive ends identical to end 470 of removable drive 426a–c. As such, it will be appreciated that the drive ends of these members can also be inserted into the wrench's drive hole 498 and held in place thereby by the magnetic attraction provided by ring magnet 422.

The drive member shown in FIG. 39a is a drill or screw bit chuck 484 having, as mentioned, a drive end 485 which is identical to end 470 and a collar surface 486 which enables end 485 to be removably received a pre-set distance within drive hole 498 (and thus cut-out 417) of the wrench. As also shown, chuck 484 is provided with a set screw 487 which when tightened secures a drill bit or screw bit (not shown) having been inserted into the chuck.

FIGS. 39b,c illustrate additional drive members of the present invention which are male sockets 488, 489 for holding a nut, bolt head and the like (not shown) much like a conventional female socket. Unlike a female socket, however, male sockets 488, 489 have an integral drive 490 for being removably received a pre-set distance within drive hole 498 and thus cut-out 417 of wrench 410. Male sockets 488, 489 also preferably have a flat collar surface 491 for controlling the distance to which the end is received in the drive hole 498 and thus cut-out 417. Flat collar surfaces 491 also serve to enhance magnetic attraction between the socket and the wrench body thereby reducing the chance that the socket might accidentally fall out of drive hole 498.

FIGS. 39d,e also illustrate straight blade and Phillips head screw driver bits 492, 493. These bits also have an integral drive 494 for being removably received a pre-set distance within the drive hole 498 and cut-out 417 of wrench 410. They are also provided with a flat collar surface 495 for controlling the distance to which the end is received in drive hole 498 and thus cut-out 417 and enhancing magnetic attraction between the bit and the wrench body, thereby reducing the chance that the bit might accidentally fall out of the drive hole.

FIG. 40 illustrate a tool kit 496 of the present invention which includes a case 497, a wrench 410 as well as a plurality of differently sized sockets such as male sockets 488, 489 of the type for receiving a nut, bolt head and the like. The sockets are preferably made from a magnetizable material such as steel so that they are capable of being magnetically held on the wrench by the magnetic attraction provided by the ring-like magnetic means. In the preferred embodiment shown, the sockets are of the aforesaid male type but they could be the conventional female type. If female, the kit will also include the aforementioned ¼, ⅜, and ½ inch removable drives 426a–c, as shown. The kit as shown also includes the aforementioned drive chuck 484 as well as straight blade and Phillips head screw driver bits 492, 493 and drill bits 499.

FIGS. 41–46 illustrate a sixth embodiment of the present invention which is a one-way ratchet wrench 510. As those skilled in the art will appreciate, wrench 510 expands upon the removable drive concept of the previous embodiment by extending the drive hole 598 all the way through the wrench (See FIG. 44) so that cut-out 517 of the wheel 516 is accessible from both sides 546, 548 of the wrench. The advantage of this embodiment is that it eliminates the need for the reversing member 438 and magnet 458 which in the previous embodiments locks the reversing member in its forward and reverse positions. These members are no longer necessary since use of the wrench in the opposite (or reverse) direction is accomplished by simply inserting the tool into the other side of the wrench. That is, as perhaps best visualized from FIG. 44, to reverse the direction of the wrench's operation one simply removes socket 488 from its position shown i.e. against side 546 of the wrench and inserts it into the opening for drive hole 598 located on the opposite side 546 of the wrench.

While this embodiment eliminates the need for the reversing member such as reversing member 438 and the locking magnet 458, to magnetically attract and securely hold a socket (or other tool) on the opposite side of the wrench, i.e on side 548, an additional ring magnet 522 will be necessary in most situations. As such, this means that it will also be necessary in most situations to position a Delrin friction reducing member 575 between the magnet and the pawls 518 to facilitate the pawls movement thereon. A Delrin member 575 is also necessary for the magnet 522 located on side 546 of the wrench since there is no Delrin reversing member in this embodiment. It will also be appreciated that the end cap for side 548 of the wrench is identical to end cap 566 for side 546 of the wrench and is therefore identified with the same number in this embodiment. Friction reducing members 575 also serve to prevent direct magnetizable metal to metal contact between the caps 566 and the wrench body 512 which might prevent the pawls from being attracted to wheel 516.

It will further be appreciated that instead of three pawls as provided in the previous embodiment this embodiment is provided with five pawls 518*a–e* which are received in corresponding pockets 520*a–e* of the wrench body 512. It will also be appreciated that wheel 516 is only provided with nine detents 524 instead of the sixteen pawls 424 provided in the previous embodiment. Nonetheless, since the pawls of this embodiment also engage in an out of phase arrangement, i.e. only one at any given time, this embodiment still has a rather high effective number of detents, i.e. forty-five which is determined by simply multiplying the number of actual detents, i.e. nine, by the number of pawls, i.e. five.

It will also be appreciated that detents 524 of wheel 516 are connected to each other by rounded surfaces 525 such that the detents are more rounded than those of the previous embodiments. That is, a rounded surface 525 defined by the wheel's rim connects each detent 525 with an adjoining detent. The provision of the rounded detents should reduce the clicking noise which is typically associated with ratchets. As such, the ratchet of this embodiment should find acceptance in applications where the clicking sound of a ratchet is objectionable such as in a submarine.

FIG. 43 shows the position the wrench's components are in when the wrench is in its drive position. As shown, pawl 516*a* is engaging a detent 524 of the wrench. FIG. 45 shows the position of the wrench's components during a return stroke. As shown, it will be appreciated that the pawls roll into and out of each successive detent during the return stroke. It will also be appreciated that the backside 521 of each pocket pushes against its associated pawl during the return stroke. In this embodiment, both the pawls and the wheel are made out of magnetizable material such as steel so that they are magnetized by ring magnets 522 and so that they attract each other which is why they roll into and out of each successive detent during the return stroke.

FIG. 46 illustrates an alternative ratchet wheel 516' for use in wrench 510. The sawtooth nature of these teeth or detents 524' should work well in the ratchet of wrench 510 since it is a one way ratchet. The sawtooth teeth should provide more positive engagement with the pawls and be less likely to roll out of engagement therewith.

FIGS. 47–51 illustrate a seventh embodiment of the present invention which is directed to a silent one-way ratchet wrench 610. Wrench 610 is identical to one-way wrench 510 except in two respects. One, the wheel is made out of a non-magnetic material such as stainless steel. Two, the friction reducing members 575 of the previous embodiment are replaced with steel or magnetizable washers 675 having a square cut-out 677. There is no need to make the washer out of a friction reducing material such as Delrin since it apparently does not matter if the wrench body becomes magnetized. This is because in this embodiment it is not necessary for the wheel and pawls to magnetically attract each other for the pawls to engage the wheel. It is necessary, however, in this embodiment for the magnet to turn with the drive which is why washer 675 is provided with square cut-out 677. The square cut-out insures that the magnet turns with the drive since the magnet is attracted to the washer which with the square cut-out turns as the drive is turned.

In view thereof, it will be appreciated that pawls 618 (which are made out of magnetizable material such as steel) are held in place or restrained by the magnetic force of the ring magnets 622 which do not move at the beginning of a drive stroke and do not begin to move until a pawl engages the wheel. The pawls are held in place or restrained because the magnets are magnetically affixed to the drive. Thus, as one begins to make a drive stroke with the wrench, the pawls fundamentally stay where they are until the pawls' pockets 620 actually begin to envelope them. This happens because the pockets are moving relative to the magnets. This movement of the pockets and magnetic holding or restraining of the pawls by the magnets actually causes the pawls to roll as they are enveloped, one of which will roll completely into engagement as shown by pawl 618*a* in FIG. 49. Again, only one of the five pawls will engage the wheel at any given time since the pawls are out of phase with respect to each other as dictated by the fact that there are only nine detents 624 as previously described.

When a return stroke is made as shown in FIG. 51, the backsides 621 of the pockets 620 simply push the pawls out of engagement into the deep part of each pocket. The pawls will not roll in and out of each successive detent 624 as a return stroke is made since the pawls are not magnetically attracted to the wheel. They simply stay in the deep part of each pocket as shown. However, when one begins to make a drive stroke with the wrench the pawls will be held in place by the magnets as previously mentioned where they are enveloped by the pockets and roll until one of the pawls such as pawl 618*a* rolls into engagement with the wheel. It is anticipated that this embodiment of the ratchet will be completely silent i.e. there will be no clicking noise typically associated with ratchets since the pawls do not roll into and out of each successive detent as a return stroke is made with the wrench.

It should also be noted that in this embodiment, pawls 618 could be made out of permanent magnet material and magnets 622 could be replaced with ring-like washers made out of magnetizable material such as steel. If replaced with such a washer, numeral 622 could simply be referred to as washers 622 or more broadly as offset means 622. Whatever they are called is not important. The important thing is that the pawls and element 622 magnetically attract each other so that the pawls are restrained or held in place by the magnetic force therebetween at the beginning of a drive stroke, as previously described.

It will also be appreciated that washer 675 could be dispensed with altogether by simply providing ring magnet 622 with a square cut-out which would insure that it does not move at the beginning of a drive stroke and that it magnetically holds the pawls in place until a pawl engages the wheel at which point the drive and affixed magnet will begin to turn as the drive stroke is made. It will also be appreciated that friction reducing washers such as Delrin washers (not shown) could be positioned between the pawls' ends and the steel washers 675 if friction between the steel washers and. pawls were to present a problem.

FIGS. 52–56 illustrate an eighth embodiment of the present invention which is directed to a silent one-way clutch-type wrench 710. Wrench 710 is identical to one-way ratchet 610 except in two respects.

One, its wheel 716 has a smooth cylindrical surface or rim 719 with no detents. As such, it is similar to wrench 210 shown in FIG. 20 which also has a smooth cylindrical surface or rim 219. It differs from wrench 210, however, in that it has no reversing member 238 nor does it need a reversing member since, as explained in connection with wrenches 510 and 610, these wrenches are one way wrenches which can be operated in the reverse direction by simply using the other side of the wrench.

Figure 54:
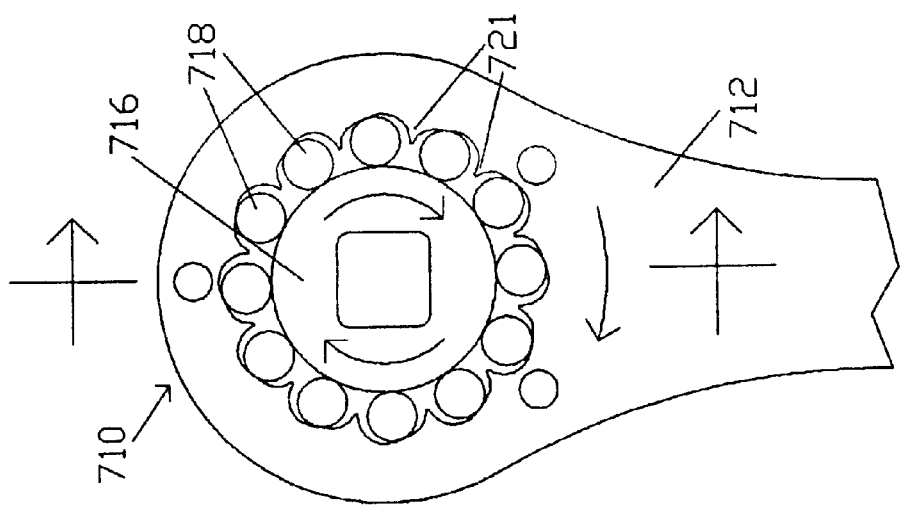
FIG. 54 is a top plan view of the wrench of FIG. 52 showing the wrench with an end cap removed to illustrate the position of the wrench's inner ratcheting components as they appear when making a drive stroke with the wrench in the clockwise direction.

Two, wrench 710 differs from wrench 610 as well as wrench 210 in that it utilizes many more pawls (which are more appropriately referred to as engaging members when used with a clutch) than either of these wrenches. As shown, wrench 710 has twelve pawls or engaging members, all of which engage rim surface 719 of wheel 716 when a drive stroke is made with the wrench, as shown in FIG. 54. The use of a high number of pawls such as twelve in a clutch type device is desirable since frictional engagement with the wheel increases as the number of pawls increases. Thus, the likelihood of slippage between the pawls and the wheel is much less in wrench 710 than it is in wrench 210.

In addition, as those skilled in the art will appreciate, the design of wrench 710 permits the use of many more pawls than the design of wrench 210 since wrench 710 does not have any reversing or abutment posts 254 which as will be appreciated interfere with and therefore limit the number of pawls which can be placed in wrench 210.

Figure 56:
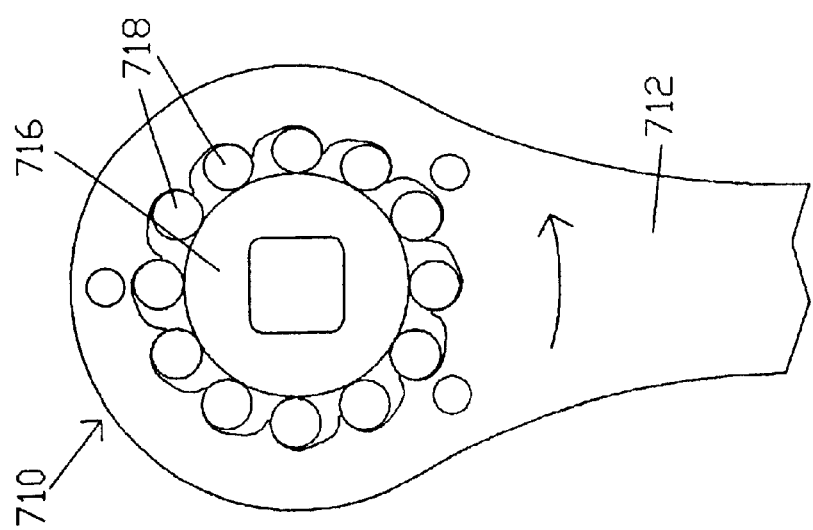
FIG. 56 is a top plan view of the wrench of FIG. 52 showing the wrench with an end cap removed to illustrate the position of the wrench's inner ratcheting components as they appear when making a release stroke with the wrench in the counterclockwise direction.

FIG. 56 illustrates the pawls' position during the making of a return stroke with wrench 710. As shown, pawls 718 have rolled from their position during the drive stroke shown in FIG. 54 where each pawl is wedged between its pocket surface and the wheel rim 719 to a position where each pawl is against the backside 721 of its pocket 720 which as shown is the deepest part of the pocket. The pawls appear to be in contact with rim surface 719 in this position but in actuality they are not. Thus, wheel 716 is in essence released by pawls 718 which causes the wheel to remain generally stationary as a return stroke is made with the wrench which as shown in FIG. 56 is done by turning it in the counterclockwise direction as shown by the arrow thereof. When one begins to make a drive stroke with the wrench, the pawls again roll into engagement with the wheel to their position shown in FIG. 54 where each pawl is wedged between its pocket surface and the wheel rim 219.

FIGS. 57–59 illustrate a ninth embodiment of the present invention which is a silent one-way ratchet-type apparatus 810. Ratchet 810 has a wheel 816 made out of magnetizable material such as steel and the rim thereof is provided with detents 824. Ratchet 810 also has a ring magnet 822 which is magnetically attracted to wheel 816 so that the ring magnet turns with the wheel. This is functionally equivalent to the arrangement in wrench 610 with ring magnets 622 being attracted to washers 675 so that they turn with wheel 616. In addition, a plate 812 is provided which is functionally equivalent to wrench body 612.

Unlike pawls 618 of wrench 610, pawls 818 are pivotally attached to plate 812 by pivot posts 820. As shown, the pawls have a free end 819 and an anchored end (not numbered) which is pivotally attached to plate 812 by pivot post 820. As also shown, the free ends 819 of the pawls pivot into and out of engagement with the detents 824 of wheel 816 as the pawls pivot about post 820 between their engaged position shown in FIG. 57 and their release position shown in FIG. 58.

Pivoting pawls 818 are made from magnetizable material such as steel so that they are attracted by ring magnet 822. As such, it will be appreciated that pawls 818 pivot from their released position shown in FIG. 58 to their engaged position shown in FIG. 57 when wheel 816 or the shaft (not shown) to which it is attached is turned in the clockwise direction as shown by the arrow on the wheel in FIG. 57.

Since ring magnet is magnetically affixed to wheel 816, the magnetic force of the magnet pulls the free ends 819 of pawls 818 into detents 824 of the wheel as it is turned in the illustrated clockwise direction. Similarly, when the wheel slows down relative to the speed at which the plate is rotating as illustrated in FIG. 58 ring magnet 822 pulls on the free ends 819 of the pawls and the detents 824 push on the free ends of the pawls to move the pawls out of the wheel's detents 824 so that the pawls are in their release position illustrated in FIG. 58 which is the position they stay in until the wheel or shaft to which it is attached is again turned in the clockwise direction as shown in FIG. 57.

A ratchet somewhat similar to ratchet 810 is disclosed in U.S. Pat. No. 5,205,386 to Goodman et al. While similar, ratchet 810 is submitted to be an improvement over the ratchet of this patent since it will not click nor does it require any springs or the plurality of individual magnets which are required by the ratchet of this patent. This embodiment as well as the previous embodiments demonstrate that the present invention may be implemented or incorporated into a bearing to provide a one-way bearing.

FIGS. 60–62 illustrate a tenth embodiment of the present invention, i.e. a silent one-way ratchet-type apparatus 910 which is similar to the previous embodiment. However, in this embodiment pawls 918 are pivotally attached to wheel 916 (instead of plate 812) and detents 924 are provided in plate 912 (instead of on the rim of wheel 816). In addition, plate 912 (instead of wheel 816) is preferably made out of magnetizable material such as steel so that ring magnet 922 and plate 912 are magnetically attracted to each other and turn together.

Similar to the previous embodiment, pawls have a free end 919 and an anchored end (not numbered). The anchored end is pivotally attached to the outer perimeter of wheel 916 by pivot post 920. As also shown, the free ends 919 of the pawls pivot into and out of engagement with the detents 924 of plate 912 as the pawls pivot about posts 920 between their engaged position shown in FIG. 61 and their release position shown in FIG. 60.

Pivoting pawls 918 are also made from magnetizable material such as steel so that they are attracted by ring magnet 922. Thus, it will be appreciated that pawls 918 pivot from their released position shown in FIG. 60 to their engaged position shown in FIG. 61 when wheel 916 or the shaft (not shown) to which it is attached is turned in the clockwise direction as shown by the arrows on the wheel in FIG. 61. Since ring magnet is magnetically affixed to plate 912, the magnetic force of the magnet attempts to hold the free ends of the pawls in place thereby causing the turning wheel 916 to in effect push the free ends of the pawls into detents 924 of the plate as the wheel is turned in the illustrated clockwise direction. The arrows shown on the plate in FIG. 61 illustrate that the plate 912 also turns in the clockwise direction once it is engaged by the pawls. Similarly, when the wheel slows down relative to the speed at which the plate is rotating as illustrated in FIG. 60 ring magnet 922 pulls on the free ends 919 of the pawls and the detents 924 push on the free ends of the pawls to move the pawls out of the plate's detents 924 so that the pawls are in their release position illustrated in FIG. 60 which is the position they stay in until the wheel or shaft to which it is attached is again turned in the clockwise direction as shown in FIG. 61. This particular embodiment of the present invention is believed to be particularly suitable for use in air turbine starters such as that discussed in the aforementioned Goodman patent. It eliminates the clicking, i.e. the ratcheting effect which causes wear and vibration.

From the foregoing, it will be appreciated that the present invention provides a ratchet/clutch-type apparatus which is extremely strong, and much less likely to wear out than conventional ratcheting apparatus, most of which use springs to push the pawl into engagement with the ratchet wheel. It will also be appreciated that the use of a magnet not only facilitates the pawls' movement into the ratchet wheel, but also magnetizes the drive, i.e., the square drive of the socket wrench for holding a socket, thereby reducing the number of wrench components which, of course, should serve to reduce manufacturing costs.

Finally, it will be appreciated that the clicking noise associated with pawl movement over the teeth of a ratchet wheel is significantly reduced or eliminated by the ratchet/clutch-type of the present invention.

The invention has been described in detail with reference to particular embodiments thereof, but it will be understood that various other modifications can be effected within the spirit and scope of this invention. For example, the ratchet/clutch-type apparatus of the present invention may be utilized in air turbine starters, fishing reel apparatus, seat belt retraction apparatus, bearing apparatus to provide a one-way bearing, wheel chair drive apparatus similar to that shown in my U.S. Pat. No. 5,236,398 and bicycle drive apparatus as well as in linear drive apparatus.

What is claimed is:

1. An apparatus comprising:
   first force transmitting member;
   second force transmitting member;
   an engaging member positioned between said first and second force transmitting members for being moved between a drive position in which said engaging member is engaging said first and second force transmitting members to prevent movement therebetween, thereby permitting force to be transmitted therebetween and a release position in which said engaging member is out of engagement with said second force transmitting member to permit movement therebetween;
   offset means for cooperating with said engaging member so that said offset means and said engaging member are magnetically attracted to each other to facilitate movement of said engaging member into the drive position when one of said first and second force transmitting members is moved in a first direction, said offset means and said engaging member further being oriented relative to each other such that the lines of magnetic force therebetween are at an angle relative to the direction in which force is transmitted between the first and second force transmitting members; and,
   means for facilitating movement of said engaging member into the release position when said one of said first and second force transmitting members is moved in a generally opposite second direction.

2. An apparatus as claimed in claim 1 wherein at least one of said offset means and said engaging member includes permanent magnet material.

3. An apparatus as claimed in claim 1 wherein at least one of said offset means and said engaging member includes electro-magnetic means.

4. An apparatus as claimed in claim 1 wherein said offset means is a permanent ring magnet.

5. An apparatus as claimed in claim 1 wherein said offset means is fixed relative to said second force transmitting member and wherein the magnetic attraction between said offset means and said engaging member restrains movement of said engaging member relative to said second force transmitting member so that said first force transmitting member facilitates movement of said engaging member into the drive position when said one of said first and second force transmitting member is moved in the first direction.

6. An apparatus as claimed in claim 1 wherein said second force transmitting member is magnetized to attract said engaging member to said second force transmitting member to facilitate said engaging member's movement into the drive position when said one of said first and second force transmitting members is moved in the first direction.

7. An apparatus as claimed in claim 1 further comprising a plurality of engaging members which are arranged in an out of phase manner so that only a predetermined number of said engaging members are moved to the drive position when said one of said first and second force transmitting members is moved in the first direction.

8. An apparatus as claimed in claim 1 wherein said second force transmitting member is provided with a plurality of engagement detents for receiving said engaging member and wherein said second force transmitting member is magnetized to attract said engaging member to said plurality of successive engagement detente so that said engaging member is moved in and out of each said succeeding engagement detent as said one of said first and second force transmitting members is moved in the generally opposite second direction and so that said engaging member is moved into a said engagement detent to its drive position when said one of said first and second force transmitting members is moved in the first direction.

9. An apparatus as claimed in claim 8 wherein said offset means is oriented relative to said engaging member such that the lines of magnetic force therebetween are generally perpendicular to the direction in which force is transmitted between the first and second force transmitting members.

10. An apparatus as claimed in claim 1 wherein said first force transmitting member defines a first surface for cooperating with said second force transmitting member to engage said engaging member in its drive position and said means for facilitating movement of said engaging member into the release position includes an abutment for pushing said engaging member into its release position.

11. An apparatus as claimed in claim 10 wherein said first surface is defined by an inner surface of a body for said apparatus.

12. An apparatus as claimed in claim 11 wherein said abutment is defined by reversing means attached to said body for reversing the direction in which the apparatus operates so that said engaging member is moved to its release position when said one of said first and second force transmitting members is moved in the first direction and so that said engaging member is moved to its drive position when said one of said first and second force transmitting members is moved in a generally opposite second direction.

13. An apparatus as claimed in claim 1 wherein said second force transmitting member includes a wheel having a rim for engaging said engaging member.

14. An apparatus as claimed in claim 13 wherein said rim includes a generally smooth cylindrical surface for frictionally engaging said engaging member.

15. An apparatus as claimed in claim 13 wherein said rim of said wheel defines a plurality of engagement detents for engaging said engaging member.

16. An apparatus as claimed in claim 15 wherein each said engagement detent is arcuately shaped to complement the shape of said engaging member.

17. An apparatus as claimed in claim 1 wherein said engaging member is a single pawl.

18. An apparatus as claimed in claim 1 wherein said engaging member includes a plurality of pawls.

19. An apparatus as claimed in claim 1 wherein said engaging member is cylindrically shaped.

20. An apparatus as claimed in claim 1 wherein said engaging member is spherically shaped.

21. An apparatus as claimed in claim 1 wherein said engaging member is an elongated member which is pivotally attached to said first force transmitting member so as to pivot into and out of engagement with said second force transmitting member.

22. An apparatus as claimed in claim 21 wherein said elongated member is pivotally attached to said first force transmitting member about a force transmitting pivot post thereof and wherein said means for facilitating movement of said engaging member into the release position includes said pivot post.

23. An apparatus as claimed in claim 1 further comprising reversing means for moving between a forward and a reverse position to reverse the direction in which the apparatus operates so that in the reverse position said engaging member is moved into the drive position when said one of said first force transmitting member and said second transmission member is moved in the second direction.

24. An apparatus as claimed in claim 13 wherein said offset means includes ring magnet means which is coaxially aligned about the axis of said wheel to a side thereof.

25. A wrench comprising;

an engaging member;

a ratchet wheel having a rim;

a wrench body defining a chamber in which said ratchet wheel is received for rotation relative to said wrench body, said wrench body also defining pocket means for receiving and positioning said engaging member adjacent said ratchet wheel rim to facilitate said engaging member's movement between a drive position in which it is sandwiched between said ratchet wheel rim and said wrench body to prevent said wrench body and said ratchet wheel from rotating relative to each other and a release position in which said wrench body and said ratchet wheel are permitted to rotate relative to each other;

ring-like magnetic means coaxially aligned with said ratchet wheel for facilitating movement of said engaging member into the drive position when said wrench body is rotated in a first direction; and, means for facilitating movement of said engaging member into the release position when said wrench body is rotated in an opposite second direction.

26. A wrench as claimed in claim 25 further comprising reversing means for reversing the direction in which the wrench operates so that said engaging member is moved into the drive position when said wrench body is moved in the second direction.

27. An apparatus as claimed in claim 26 further comprising second magnetic means for cooperating with said reversing means to maintain said reversing means in its forward or reverse position.

28. A wrench as claimed in claim 25 wherein said ratchet wheel rim is provided with a plurality of detents for engaging said engaging member.

29. An apparatus comprising:

first force transmitting member;

second force transmitting member;

an engaging member positioned between said first and second force transmitting members for being moved between a drive position in which said engaging member is engaging said first and second force transmitting members to prevent movement therebetween, thereby permitting force to be transmitted therebetween and a release position in which said engaging member is out of engagement with said second force transmitting member to permit movement therebetween;

magnetic means for facilitating movement of said engaging member into the drive position when one of said first and second force transmission means is moved in a first direction, said magnetic means being positioned out of the plane in which force is transmitted between the first and second force transmitting members such that substantially all of the force transmitted between the first and second force transmitting members bypasses said magnetic means; and, means for facilitating movement of said engaging member into the release position when said one of said first and second force transmitting members is moved in a generally opposite second direction.

\* \* \* \* \*